United States Patent
Courtney et al.

(10) Patent No.: US 6,917,167 B2
(45) Date of Patent: Jul. 12, 2005

(54) METHOD AND APPARATUS FOR TRACKING SEQUENCES OF AN ELECTRICAL DEVICE CONTROLLABLE FROM MULTIPLE LOCATIONS

(75) Inventors: Brian Courtney, Germansville, PA (US); Neil Orchowski, Pittsburgh, PA (US); Kevin Kocher, Allentown, PA (US); Paul DiBenedetto, Emmaus, PA (US); William H. Howe, Palm, PA (US); Matthew Bamberger, Coopersburg, PA (US)

(73) Assignee: Lutron Electronics Co., Inc., Coopersburg, PA (US)

( * ) Notice: Subject to any disclaimer, the term of this patent is extended or adjusted under 35 U.S.C. 154(b) by 0 days.

(21) Appl. No.: 10/654,106

(22) Filed: Sep. 3, 2003

(65) Prior Publication Data

US 2005/0046360 A1 Mar. 3, 2005

(51) Int. Cl.[7] ............................................... H05B 37/00
(52) U.S. Cl. ....................... 315/318; 315/292; 315/361; 700/83; 712/245; 704/270; 340/825.37
(58) Field of Search ................................. 315/292, 294, 315/297, 312, 318, 361; 700/83; 712/245; 704/270, 272; 340/825.37; 379/102.1; 362/233, 239

(56) References Cited

U.S. PATENT DOCUMENTS

| | | | | |
|---|---|---|---|---|
| 4,947,302 A | * | 8/1990 | Callahan | 362/233 |
| 5,059,871 A | | 10/1991 | Pearlman et al. | 315/316 |
| 5,086,385 A | * | 2/1992 | Launey et al. | 700/83 |
| 5,689,261 A | | 11/1997 | Mehta et al. | 341/173 |
| 5,769,527 A | * | 6/1998 | Taylor et al. | 362/85 |
| 5,905,442 A | | 5/1999 | Mosebrook et al. | 340/825.06 |
| 5,942,814 A | | 8/1999 | Sutterlin et al. | 307/125 |

FOREIGN PATENT DOCUMENTS

| FR | 2 801 128 | 5/2001 |
|---|---|---|
| FR | 2 807 554 | 10/2001 |

* cited by examiner

*Primary Examiner*—Haissa Philogene
(74) *Attorney, Agent, or Firm*—Ostrolenk, Faber, Gerb & Soffen, LLP

(57) ABSTRACT

In an electric system that controls electrical or state variable devices through inputs received from device operators such as switches, buttons and the like, where some of the button control or set sequences for the electrical devices and others predefined "presets", an automatic sequence tracking process monitors the system and adjusts the position of the sequence steps for buttons that are associated therewith, to ensure that they always track the current condition of the electrical devices. Thereby, actuation of sequence generating buttons will always choose the next step in a sequence for the corresponding electrical device.

34 Claims, 26 Drawing Sheets

METHOD AND APPARATUS FOR TRACKING SEQUENCES OF AN ELECTRICAL DEVICE CONTROLLABLE FROM MULTIPLE LOCATIONS

BACKGROUND OF THE INVENTION

The present invention relates to control systems for electrical devices, in particular, electrical devices such as lighting and motor controls, for example, motors for controlling equipment such as fans and window shades, as well as other electrical device loads. In particular, the present invention is directed to the control of systems operating electrical device load, and in particular, electrical device loads which are controllable from more than one location. For example, the present invention is directed to a system for controlling electrical device loads such as room lighting, ceiling fans and window shades from multiple control locations such as wall mounted keyboards, and which allows the synchronized tracking of sequences of operations of the electrical device loads from the multiple control locations. For example, according to the present invention, if at one control location a single control button can control a sequence of operations of an electrical device, the present invention allows that sequence of operation to be tracked from other control locations.

In the prior art, it is known to have lighting systems which have centralized controllers for controlling the operation of the lighting systems. For example, in large building structures, e.g., large residences, with large numbers of rooms, without such a centralized lighting control system, a substantial amount of time would be expended in determining whether the lights in various rooms are on or off and in turning such lights off. In addition, the unnecessary lighting of rooms will cause a waste of energy and money. Accordingly, systems have been developed to control lighting in structures from central or predefined locations in the structure. Some of these systems use hard wired control wiring to control the various lighting controls located in the building. Others use radio frequency or other types of controls for example, power line carriers, to provide the control information to the lighting controls. Such systems are particularly suited to retrofitting in existing structures, but are even desirable in new construction because the hard control wiring in large structures is often very complex. Further, some of these systems may use combinations of these control schemes. In addition, loads other than lighting can be controlled such as security systems, audio-visual systems, ceiling fans, air conditioning and heating and ventilating systems, window shades and other window fixtures, etc.

In these systems, if a particular control, for example, a keypad at a first location includes an actuator which operates according to a sequence, for example, where each actuation of the actuator causes the load to cycle to a different operational state, for example, in the case of a lamp, the sequence may include operational states (also called presets) including 100% intensity, 75% intensity, 50% intensity, 25% intensity and Off, the other controls in the system controlling the same electrical load may not track the sequence controlled by the first device. Sequences are often used, because the alternative, individual buttons for each preset, would entail too many buttons and proves both intimidating to use and aesthetically unpleasing. As an example, if the first keypad has been sequenced such that a lighting load is at 25% intensity, the next step or preset in the sequence would be 0% intensity or Off. However, if the user is at another location which controls the same lamp load, the control at the second location will not track that the next state in the sequence should be Off, i.e., that the next actuation of the control at the second location should turn the lamp Off. In addition, the control actuators often include visual indicators such as LED displays to indicate the current status of the controlled electrical device. Although the preset status of the controlled electrical device may be indicated at the first location from which the electrical device was controlled, the second device will not show the correct status.

It is therefore an object of the present invention to provide an electrical device control system wherein electrical devices are controllable from multiple locations and wherein the electrical devices are operated through a sequence of preset steps such that the sequence is tracked at any of the control locations.

An example of the problems of the prior art system are shown in FIG. 1. FIG. 1, comprising panels 1-1 to 1-5, shows the prior art systems fail to track, at multiple locations, the states of an electrical device which undergoes a sequence of steps. In FIG. 1, window shades are being controlled from two locations, control station 1 and control station 2. Control station 1 includes a sequence button which sequences through a series of steps for each depression of the button. For the first depression of the button the window shade is raised. The next actuation of the button stops the window shade. The third actuation of the button lowers the shade and the fourth actuation stops the shade. Thus, the sequence is raise, stop, lower, stop, looping back to the first step after the last step.

Control station 2 also has a series of buttons but it includes a raise/stop button and a lower/stop button, not a sequence button, in the illustrated embodiment, though it could also include a sequence button and would suffer from the same problems. When the raise/stop button is depressed, depending on the current state of operation, the window shade will either raise or stop. For the lower/stop button, depending on the current state of operation, the window shade will either lower or stop. For example, if the window shade is currently lowering, when the lower/stop button is depressed, the window shade will stop.

Assume for the purposes of this example that the sequence button of control station 1 had been pressed twice to raise and stop the shade. Thus, the sequence is current in step 2 and the window shade is stopped. At the control station 2, the lower/stop button is then depressed to lower the shades until they stop. This is indicated by panel 1-2 of FIG. 1.

As shown in panel 1-3, in response to the actuation of the lower/stop button, the shades lower and stop once they are fully closed. Therefore the current state of the window shades is now that they are stopped. At control station 1, the sequence remains in step 2. However, the window shades are fully lowered at this point because of the operation performed at control station 2.

Accordingly, as shown by panel 1-3, although the shades are now fully lowered and stopped, the sequence status at control station 1 is that the sequence is now in step 2. If the user presses the sequence button at control station (panel 1-4), because the sequence is in step 2, the sequence will cycle to step 3 which is to lower the shades. Because the shades are already closed, however, the depression of the sequence button at control station 1 has no effect, as indicated in panel 1-5 of FIG. 1. The shade does not move because the next step in the sequence is step 3, to lower the shade. Therefore, depressing of the sequence button does not cause the shades to rise, as the user expects, because they are in the fully lowered state, and the sequence stays in step 3. The user would be required to press the button two mores times (stop and raise) before the shades will be raised.

Accordingly, the prior art system suffers from a deficiency in that the sequence of steps is not tracked at a first location when a change in the controlled electrical device status is made at a second location.

FIG. 2 comprising Panels 2-1 to 2-5 shows another prior art example directed to a so-called "art gallery". For the purposes of the example, assume that there are a number of art works A–E on an art tour in a building. It is desired that when a particular artwork in the tour is approached, a tour guide can turn on a light to illuminate the particular piece of art. Assume that a control station 1 is provided which has a sequence button which allows the tour guide to sequence the lamps at each of the art works by each depression of the button or automatically via a timer operation, with a pre-defined amount of time allowed at each artwork. Also provided at each art work are toggle buttons to turn on/off the lamp at the particular art work. Assume that the tour guide has been giving the tour using the sequence button. The tour is now at art C (step 3) of the sequence and the zone 3 light is on. This is shown in panel 2-1 of FIG. 2.

At panel 2-2, the guide wishes to go back to art B. He therefore presses the toggle button at art C to turn off the zone 3 light. Then the toggle button at art work B is pressed to turn on the zone 2 light. The sequence remains in step 3 but the tour guide is now at art B. As shown in panel 2-3, the guide is presenting the art work at B again and the zone 2 light on. The sequence button remains in step 3 as shown, however, see panel 2-3.

Panel 2-4, the guide wishes to resume the tour and presses the sequence button to go to the next step. Because the tour is at art work B, the guide expects the light at art C to turn on. However, as shown by panel 2-5, the lighting advances to art D and the zone 4 light turns on. Meanwhile, the tour is at art C and the art is not illuminated. The reason for this operation is that although the tour guide was at art work B and wanted again to go to art work C, the controller, as controlled by the control station 1 sequence, was still in step 3 (Art C). It did not track the change from art work C back to artwork B. Accordingly, because the sequence was in step 3, the next step in the sequence in step 4, art work D, which is not where the tour guide wanted to be.

FIG. 3 shows one further example of the problem presented by the prior art. In FIG. 3, there are two ceiling fans controlled by two control stations, control station 1 and control station 2. At control station 1, a sequence button is provided which sequences the fans through high, medium, low and off. At control station 2, a fan speed control comprising a plurality of individual buttons, one for high, medium, low and off is provided. As shown in panel 3-1 of FIG. 3, the sequence button at control station 1 has been pressed twice to set the fans at medium speed. Thus, the sequence is in step 2 (medium).

As shown in panel 3-2, at the control station 2, a button is pressed to turn the fans to off.

As shown in panel 3-3, the fans turn to off and stop rotation. The sequence remains in step 2 meaning that the sequence is in medium speed, when in fact, the fans have been turned off as shown by the LED display at control station 2 in panel 3-3. Accordingly, in addition to the sequence being in step 2 (medium speed) when in fact the fans are off, and the system should be in step 4 of the sequence, the LED display at the two control stations are inconsistent. At control station 1, the sequence control indicates that the fan is on whereas control station 2 correctly indicates that the fan is off.

In panel 3-4, the sequence button is again depressed at control station 1. Because the fans are off, the user thinks the fans will turn on to high, the next and first step in the sequence. As shown in panel 3-5, in fact, because the sequence is still in step 2 (medium speed), the fan cycles to low speed, which was not the action that the user expected.

The above examples show the problems inherent in the prior art systems which do not allow tracking of sequences of presets.

Although there are means using conditional logic (programs using "if-then" statements) to solve the above problems, the conditional logic approach is highly complex and requires large amounts of programming time and often must be preprogrammed whenever there is a change in the size of the system, i.e., when additional electrical devices are added to the system.

It is accordingly desirable to be able to provide a system which allows for tracking of sequences of operation of electrical load device that is simple to implement and that will automatically expand as the system expands.

SUMMARY OF THE INVENTION

The foregoing and other objects of the invention are realized by a system controlled for a system that includes electrical devices and device operators thereof. The electrical devices may be lights or other devices, such as fans, motors, shades or other appliances and combinations thereof. The device operators are various switches or button controls or vernier-type operators that control the operations of the electrical devices to turn them on and off, or to assume certain parameter levels, or intensity, or become raised or lowered (in the case of shades) and the like.

Preferably, the device operators include one or more device operators of a first type that are capable of setting a plurality of sequenced steps for a corresponding electrical device, where each step represents a given state of the electrical device and in which steps are normally programmed to follow one another in a prescribed order or sequence. A sequencer, which may be a hardware device or preferably a software function that controls the sequencer, is associated with the device operator and operates to cause it to normally follow the sequence steps in the prescribed order.

A tracking process or a hardware sensor monitors a particular electrical device and notes if the state of the device has changed in response to an input from another device operator which has caused the electrical device to assume a state different than the next expected sequence step. The tracking processor then modifies and adjusts the state of the sequencer to reflect the changed condition of the device being controlled, so that the subsequent actuation of the device operator will command the expected sequence for the electrical device being controlled.

Preferably, the system controller operates in conjunction with a plurality of electrical devices and device operators, with corresponding ones of the electrical devices being controlled by different device operators.

The device operators preferably incorporate visual indicators that indicate the state of the electrical device or appliance being controlled. Preferably, the visual indicator is an LED or the like.

The device operators may be push buttons or dimmer switches or vernier-style controllers, etc. These device operators may be part of an electrical system that also incorporates a main or central processor and the device operators may communicate with the control processor wirelessly or through hardwired connections.

Other features and advantages of the present invention will become apparent from the following description of the invention which refers to the accompanying drawings.

BRIEF DESCRIPTION OF THE DRAWINGS

The invention will now be described in greater detail in the following detailed description with reference to the drawings in which.

DETAILED DESCRIPTION OF PREFERRED EMBODIMENTS

Figures 1, 2:
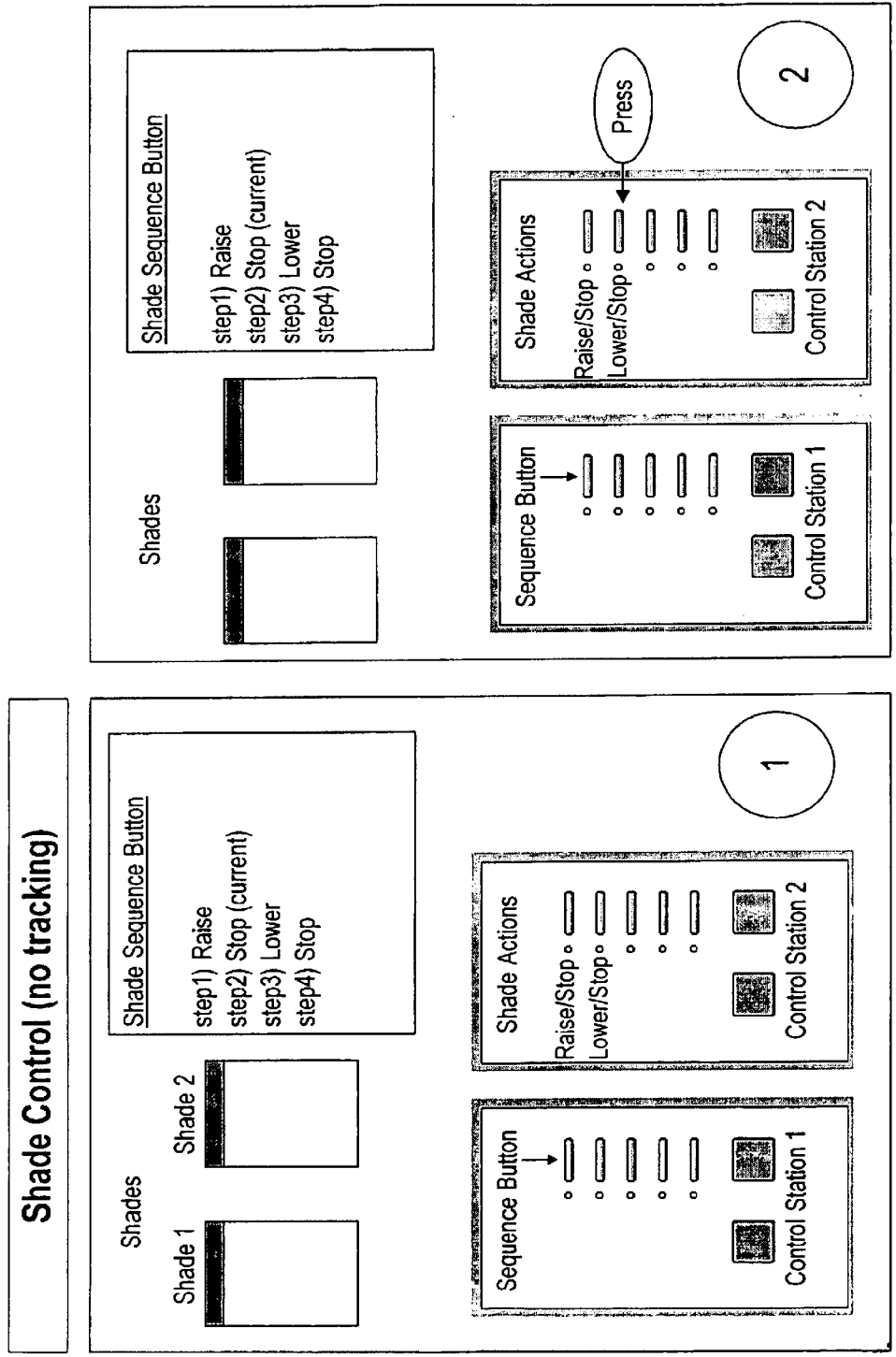
FIG. 1, comprising panels 1-1 to 1-5, shows how prior art systems fail to keep track of sequences of operation for the control of window shades.
FIG. 2, comprising panels 2-1 to 2-5, shows how a prior art system would fail to keep track of sequences in art gallery tour.
Figures 1, 2, 3, 4:
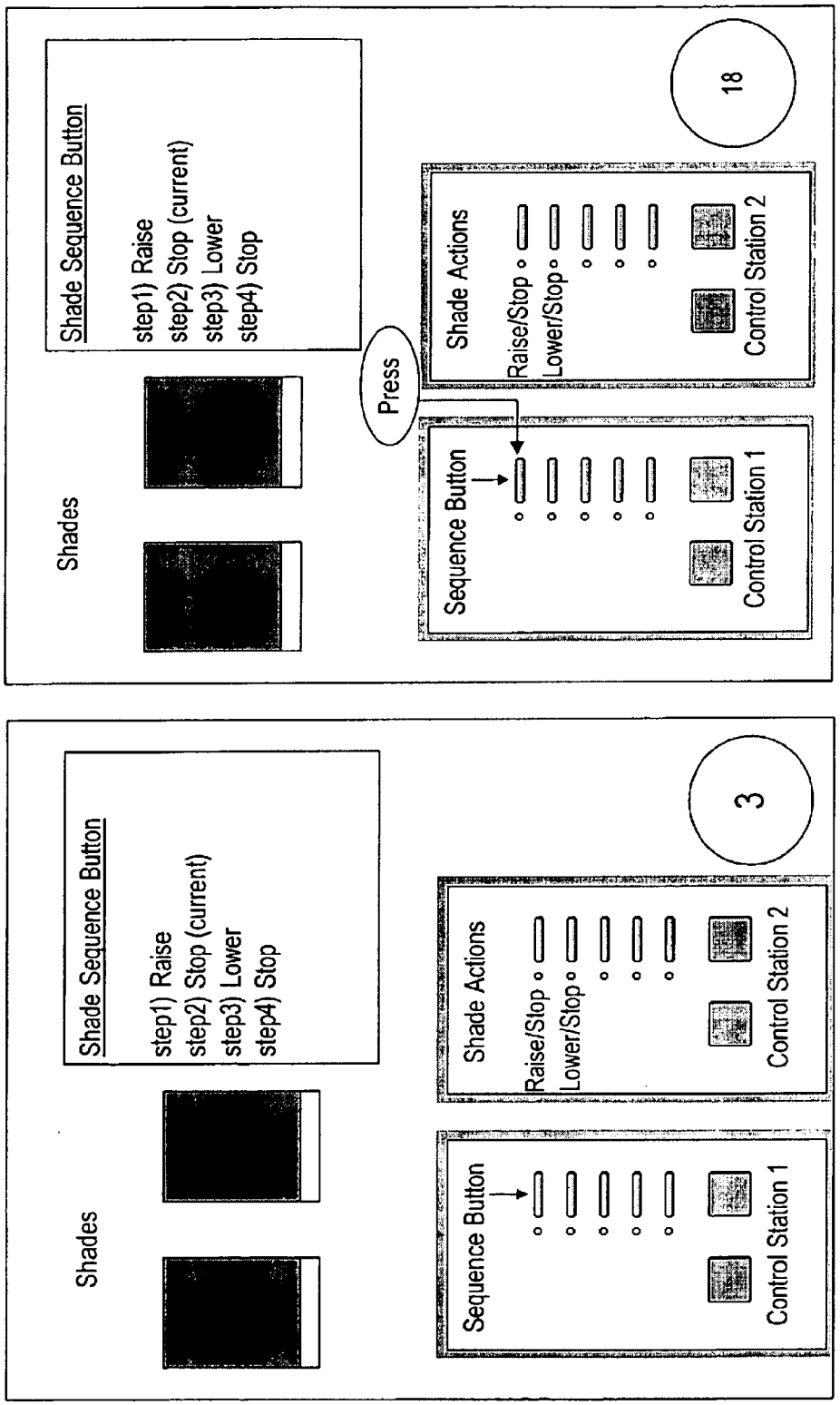
FIG. 3, comprising panels 3-1 to 3-5, shows how a prior art system would fail to keep track of sequences of operations of ventilating fans.
FIG. 4 is a simplified block diagram of an overall electrical device control system according to the present invention, for example, adapted to the control of lighting in a building structure.

With reference again to the drawings, FIG. 4 is a block diagram of an electrical device control system 10 which is to be controlled according to the present invention.

The electrical device control system 10 may comprise a central wired processor 20 that operates a stored software program to issue various operation commands through interface devices, such as wired dimmer 24a, remote power module 24b, second remote power module 24c and RF processor 28. The operation commands are directed to a variety of devices that need to be controlled such as the first light 22a, a fan 22b, a window shade 22c and a pair of lights 22d and 22d. Although only a single wired dimmer and two remote power modules are shown, the system can have further wired dimmers and remote power modules controlling additional loud devices or connected to control the same load devices as other interface devices.

The RF processor 28 comprises an antenna 28a and is thus able to communicate with an RF dimmer 24d for the light 22d and an RF dimmer 24c for the light 22d. There can be additional RF dimmers or other RF interface devices.

Operating instruction for the devices such as the lights 22a, 22d and 22d, the fan 22b and the window shade 22c are received at the wired processor 20 from such device controllers as first wired keypad 26a, second wired keypad 26b, first RF keypad 26c and second RF keypad 26d. There may be further keypads or other device controllers.

Communications between the RF processor 28 and the RF keypads 26c, 26d and the RF dimmers 24d, 24e can be either direct or through the RF repeater 30 that includes its respective antenna 30a. There can be additional RF keypads or other RF control devices as well as RF repeaters.

As already noted, devices such as the wired or RF keypads (26a, 26b, 26c and 26d) may produce to the wired processor 20 instruction in the form of "sequence steps" which activate "presets". Sequences are a set of programmable steps that provide a series of preset scenes that are accessible in a cycle fashion. Many different types of devices may be programmed for control by sequences. Such devices may includes lights, window shades, ceiling fans, motors, etc.

Typically, sequences are created and assigned to a particular button on a particular keypad in the system 10. The steps in the sequence may be cycled through manually or automatically. For manually controlled sequences a button press on the keypad, for example, the wired keypad 26a, will advance the sequence to the next preset scene. For automatically controlled sequences, the sequence will advance to the next preset scene after a specified time duration for that step.

As previously noted, a drawback of the prior art is that the sequences assigned to an individual button on a system keypad, i.e., the steps in that sequence, are advanced in a predetermined order—using a press of that button or time based automatic advancement and the sequence will not be advance or updated by any external changes in the system. For example, the wired keypad 26a may be programmed/wired so that the light 22a will be at 25%; 50%; 75%; 100%; 0% intensity, in response to each successive actuation of the corresponding operating button, for example the sequence button 27b in FIG. 5. The sequence order cannot be altered in the prior art system 10. Therefore, if another wired keypad 26b of a "toggle-type", which alternately controls the lights 22a On and Off, were to be pressed, for example turning the light off, the sequence would remain in the state where is previously was, so that the next actuation of the sequence button may not result in the expected action, as described previously.

The same drawback applies to the fan 22b whose sequences may comprise OFF, LOW, MEDIUM and HIGH fan speeds. Similarly, for the window shade 22c, the sequence may comprise the steps of: RAISE, STOP, LOWER, STOP. In the prior art systems that utilize multiple button controls for the same device, the sequence does not track the actual load state when the load is controlled from multiple locations.

Figures 1, 2, 3, 4, 5:
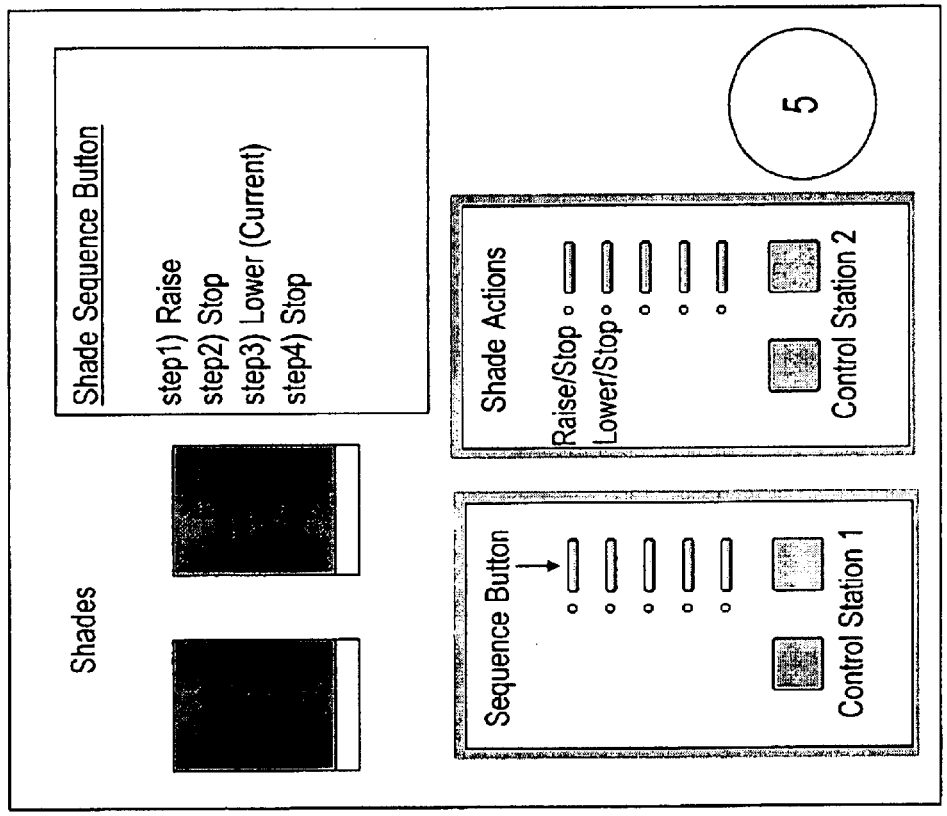
FIG. 5 shows the operation of the prior art system controlling a lighting device.
Figure 2:
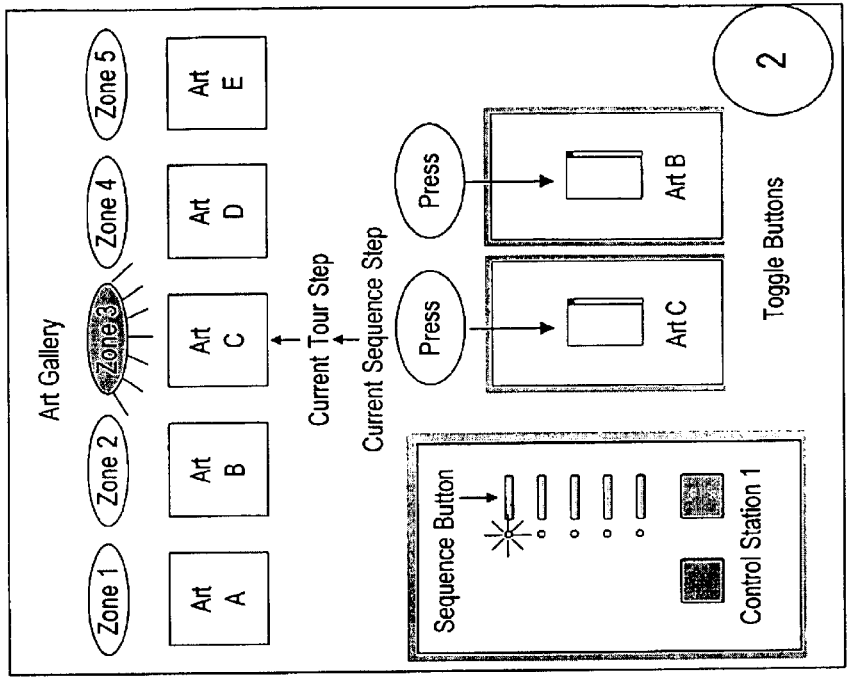
Figures 1, 2:
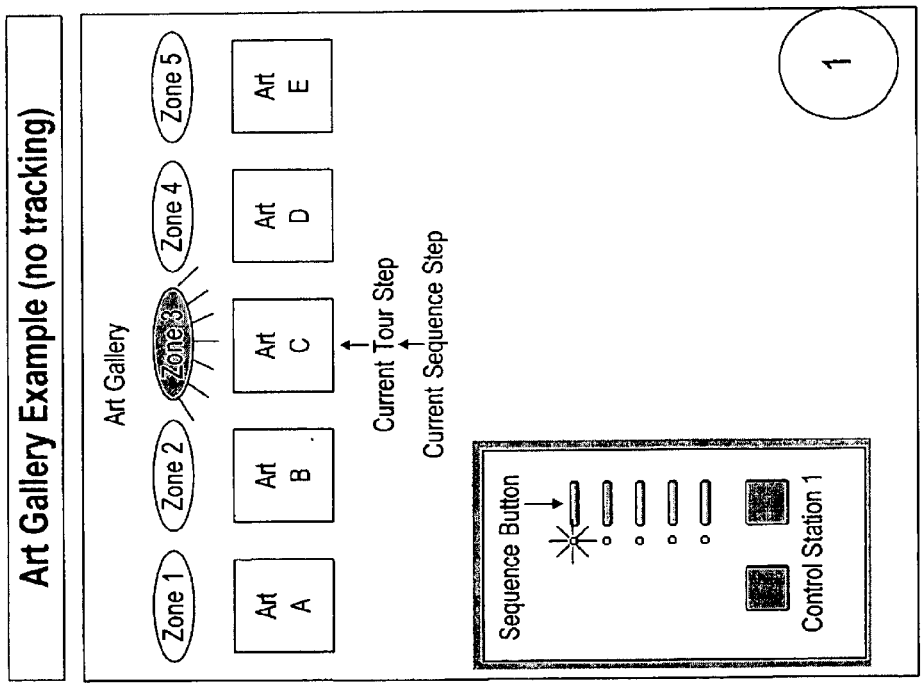
Figures 2, 3, 4:
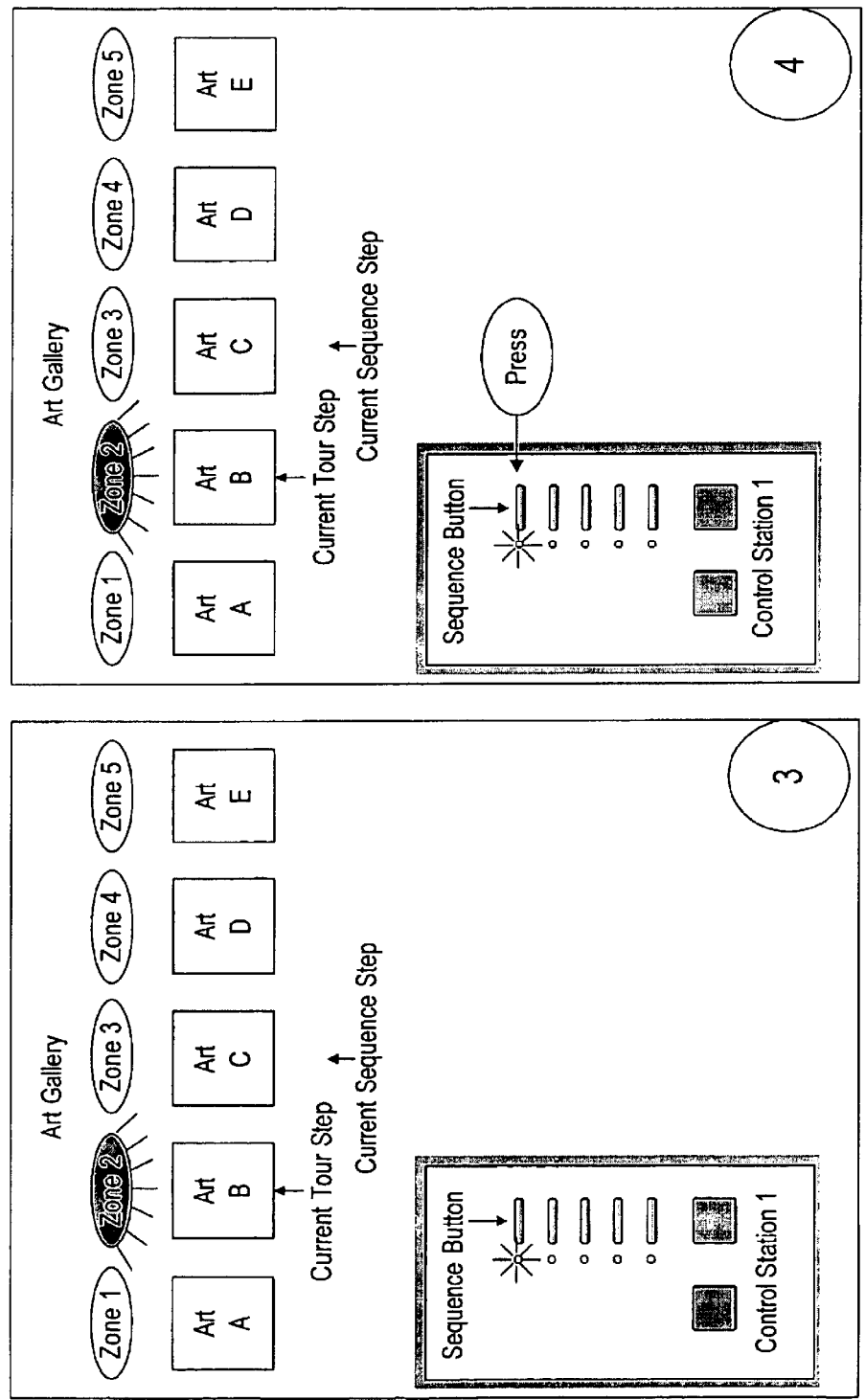
Figures 2, 3, 4, 5:
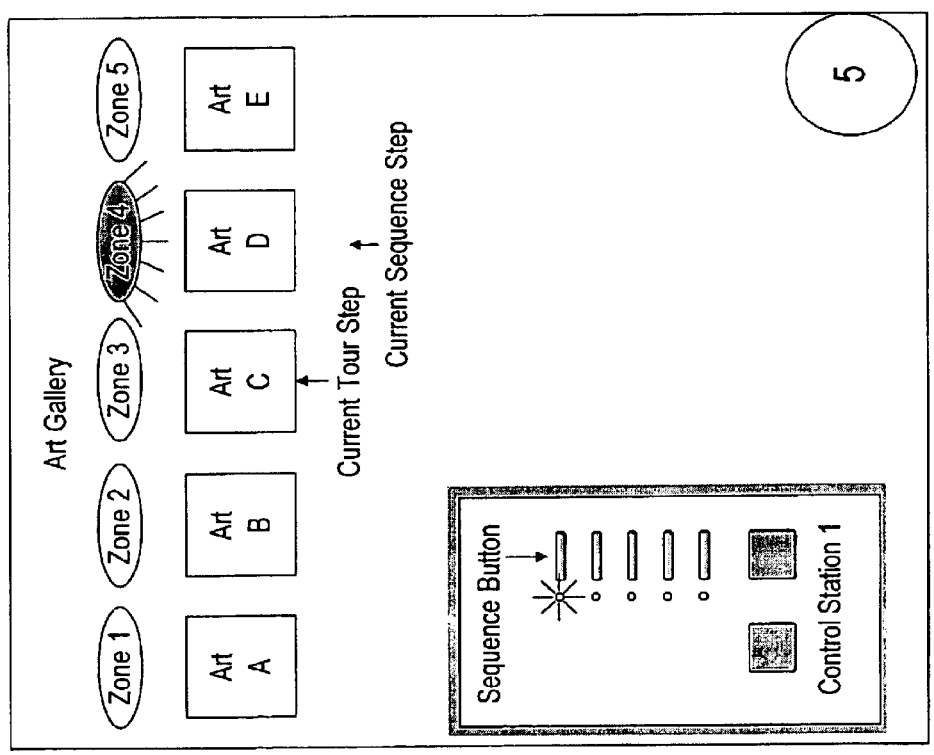
Figures 1, 2, 3:
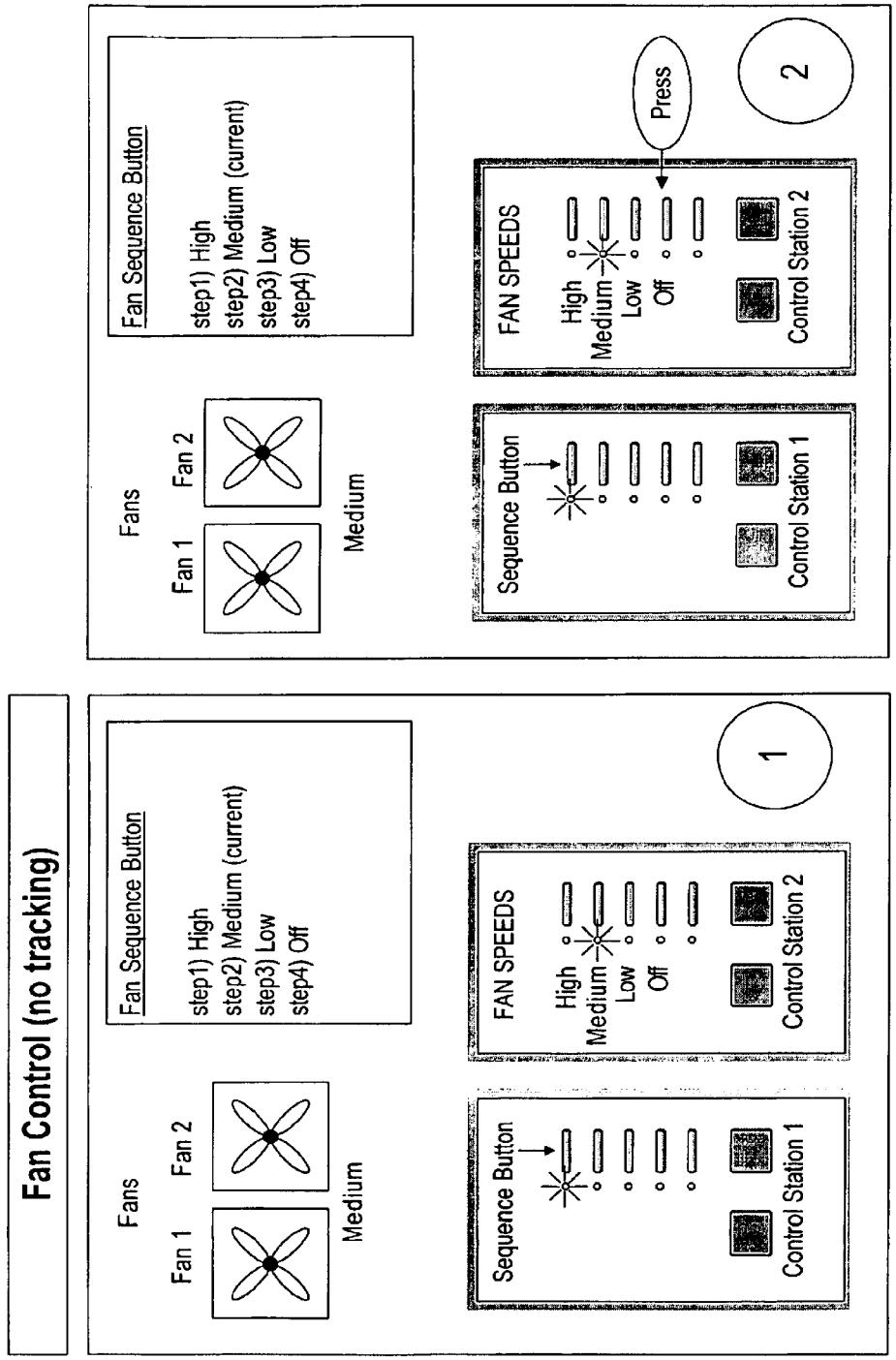
Figures 3, 4:
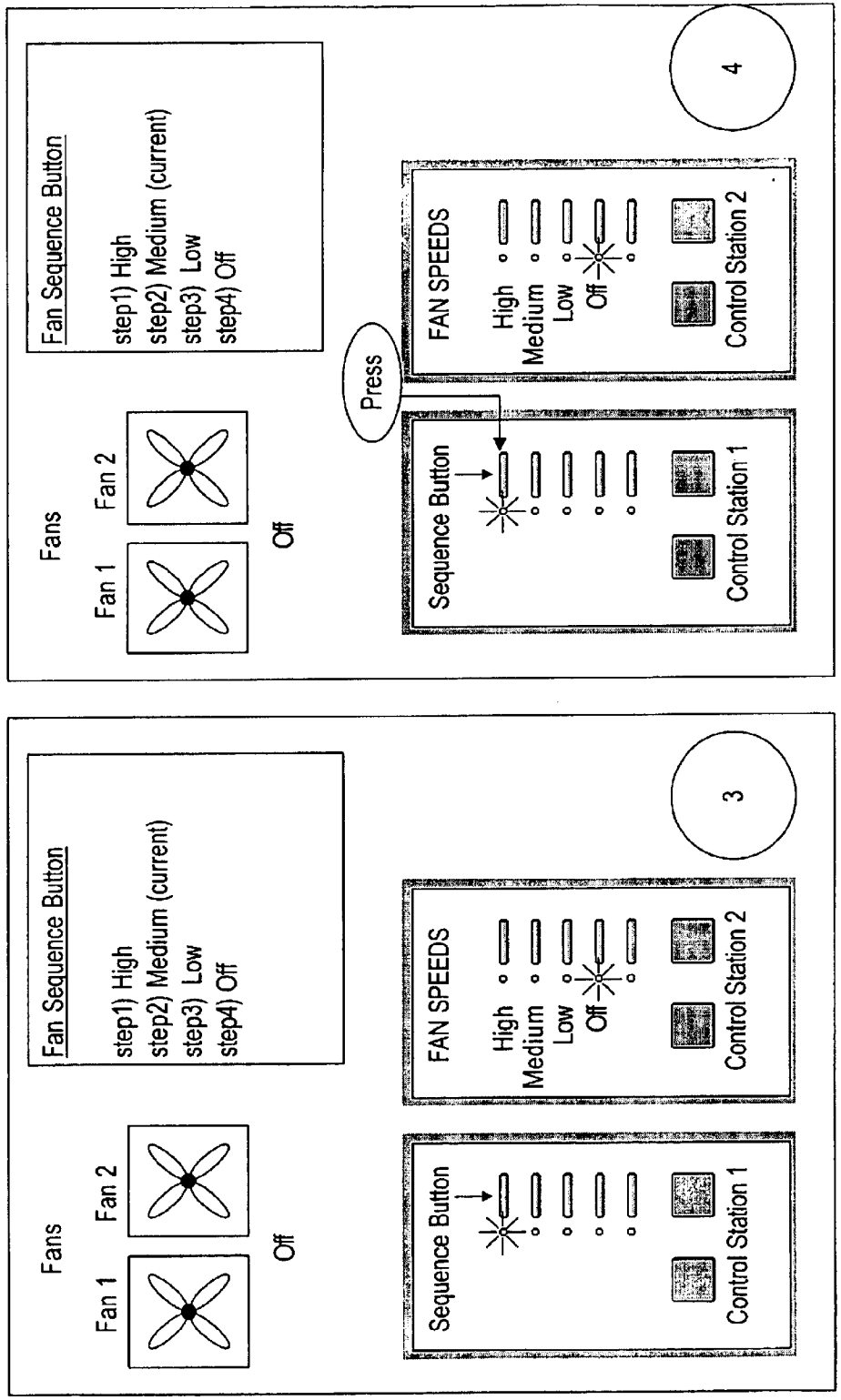
Figures 3, 4, 5:
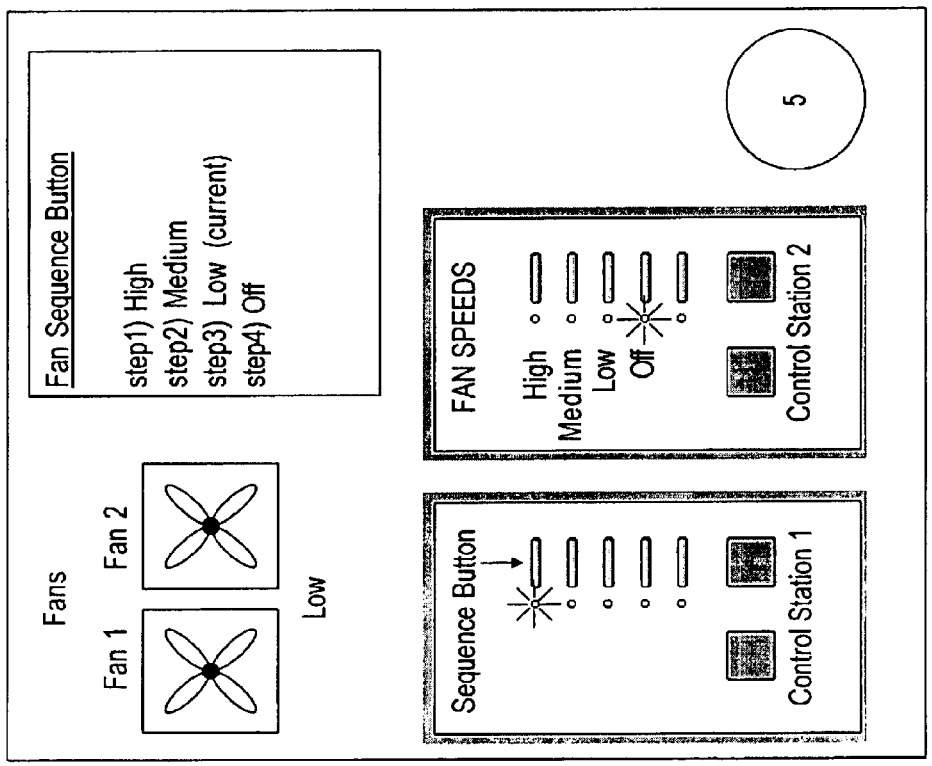
Figure 4:
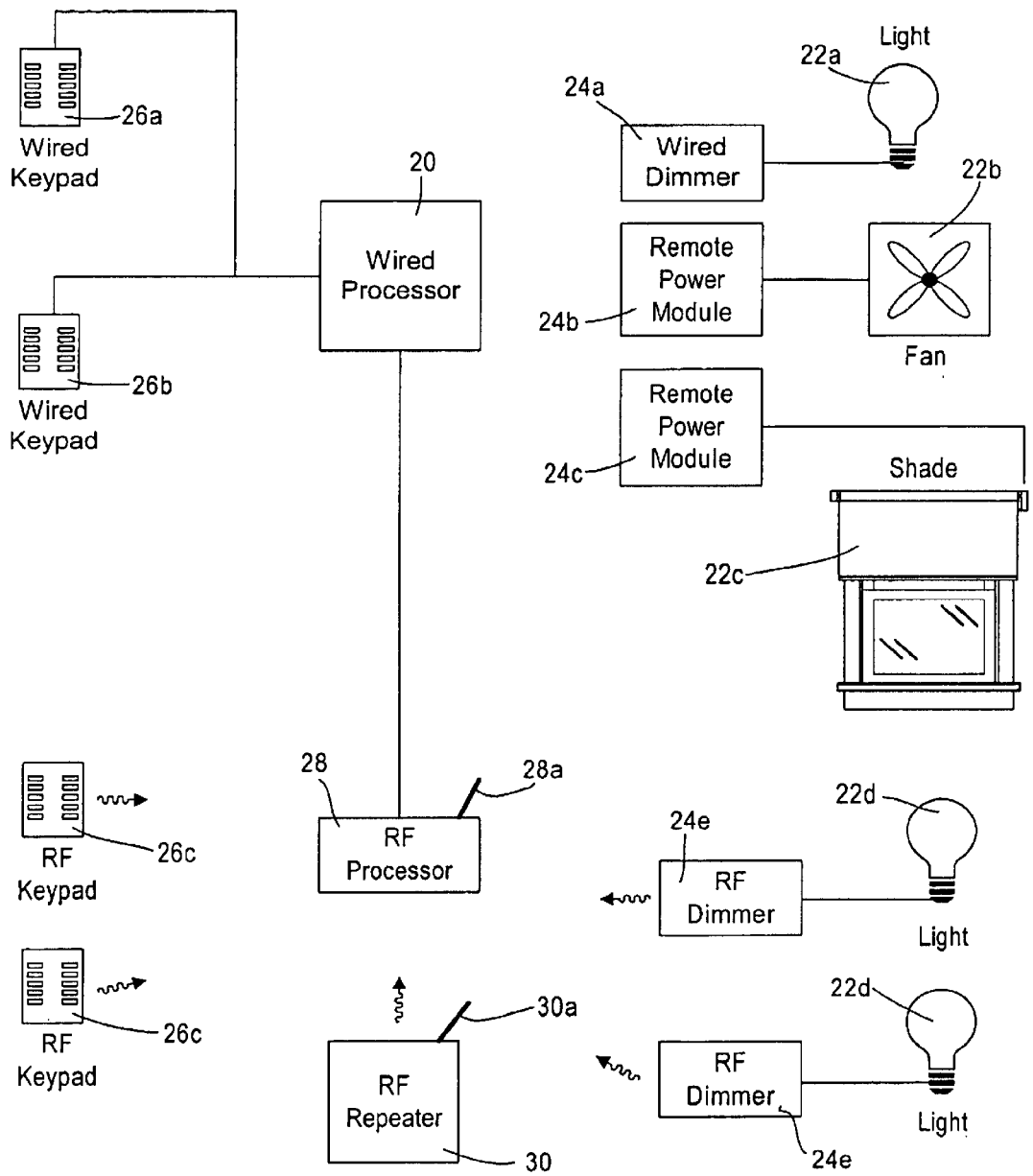
Figure 5:
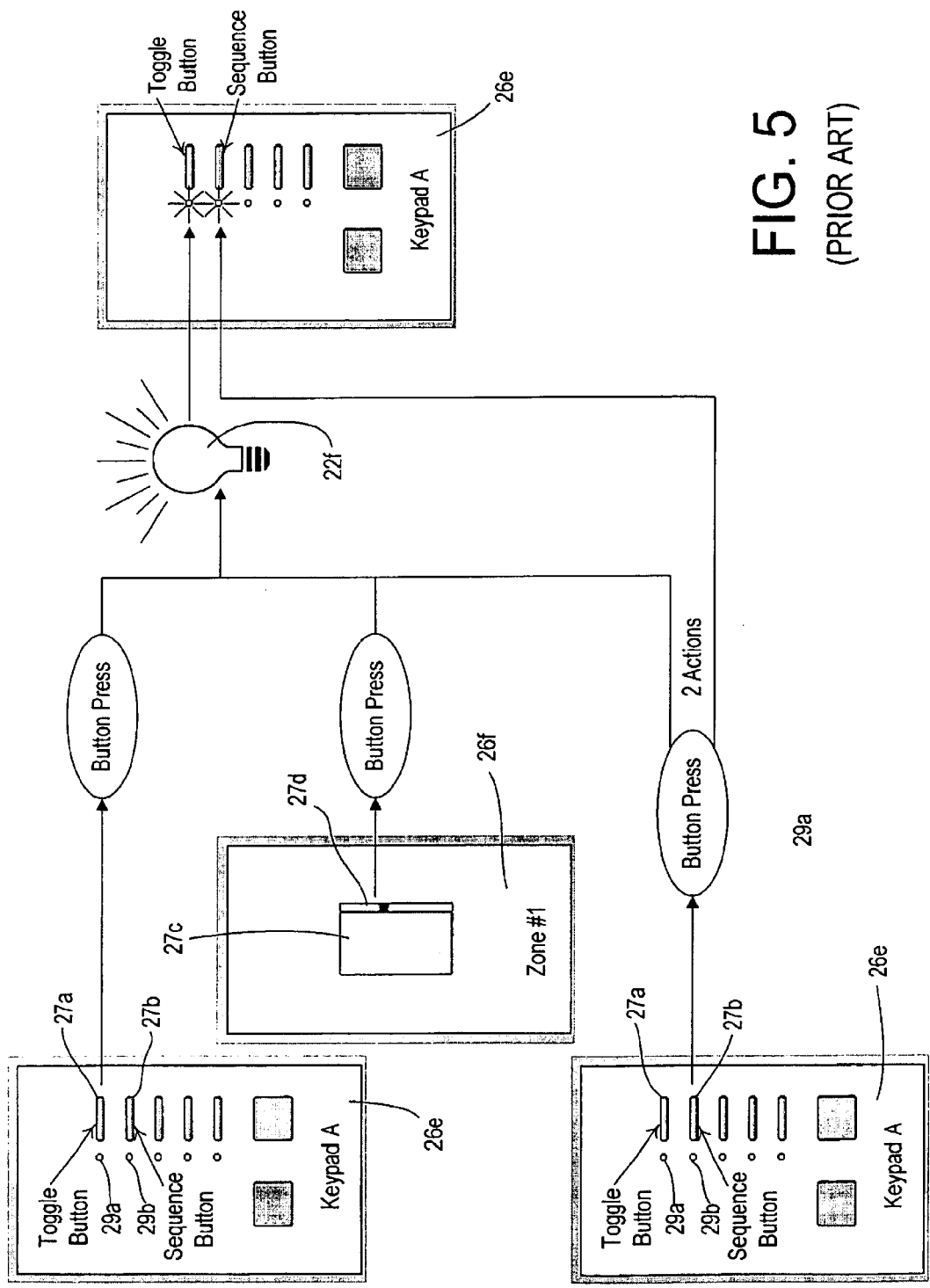

FIG. 5 diagrammatically illustrates the prior art operation of the system 10 by illustrating the light 22f being controlled by various commands from device operators such as the keypad 26e and a dimmer switch 26f. The same keypad 26e is shown three times in FIG. 5, to illustrate different button actuations or different keypad indicator states. For example, in the upper left had corner of FIG. 5, keypad 26a illustrates toggle button 27a actuation. In the lower left hand corner of FIG. 5, sequence button 27b actuation is illustrated. In the upper right hand corner of FIG. 5, the changed state of the LED indicators of the keypad 26d is illustrated.

The keypad 26e comprises a toggle button 27a and a corresponding LED 29a which is controlled, as shall be described, to reflect the state of the load 22f as set by the dimmer switch 26f. In addition, the keypad 26e comprises a "sequence" actuation button 27a and a corresponding LED 29b. When the toggle button 27a is pressed, the state of a "preset #1" is toggled. The state of the "preset" is determined by the condition of the LED 29a (On/Off). If the LED 29a is not lit, the pressing of the button 27a will turn On or activate the "preset". If the LED 29a is lit, the button 27a will turn the preset Off.

A second device operator 26f is a dimmer switch having a button 27c and a dimmer setting portion 27d. When the button 27c is pressed, it will dim or turn On/Off the light 22f connected to a corresponding dimmer as determined by the setting of setting portion 27a. This affects the state of all presets that have that particular load assigned to the preset, e.g., the light 22f.

Operation of the sequence button 27b on the keypad 26e is illustrated at the lower left-hand side FIG. 5. Successive pressing of the sequence button 27d produces a sequence which may be as follows: STEP 1) Preset #2; STEP 2) Preset #3); STEP 3) Preset #4; and STEP 4) Preset #5. The LED 29b will assume the states of: ON; FLASH/1; FLASH/2 and OFF, corresponding to the aforementioned steps 1–4. When the button 27b is pressed it activates the preset for the next step in the sequence. The LED state is defined by each step of the sequence.

For example, the step 1, the LED opposite the sequence button is ON. For step 2, it flashes in a first manner and for step 3 it flashes in a second manner. For step 4, the load is off, as is the LED.

As described above, the light 22f, which may be assigned to a particular zone either alone or with other lights, has its intensity/level affected by "presets" that are activated via button presses or by local dimmers. The intensity/level of the load will act to update the LED state of the toggle button, i.e., the LED 29a. However, in accordance with the prior art, it will not update the LED state of the sequence button as reflected by its associated LED 29b.

Figure 6:
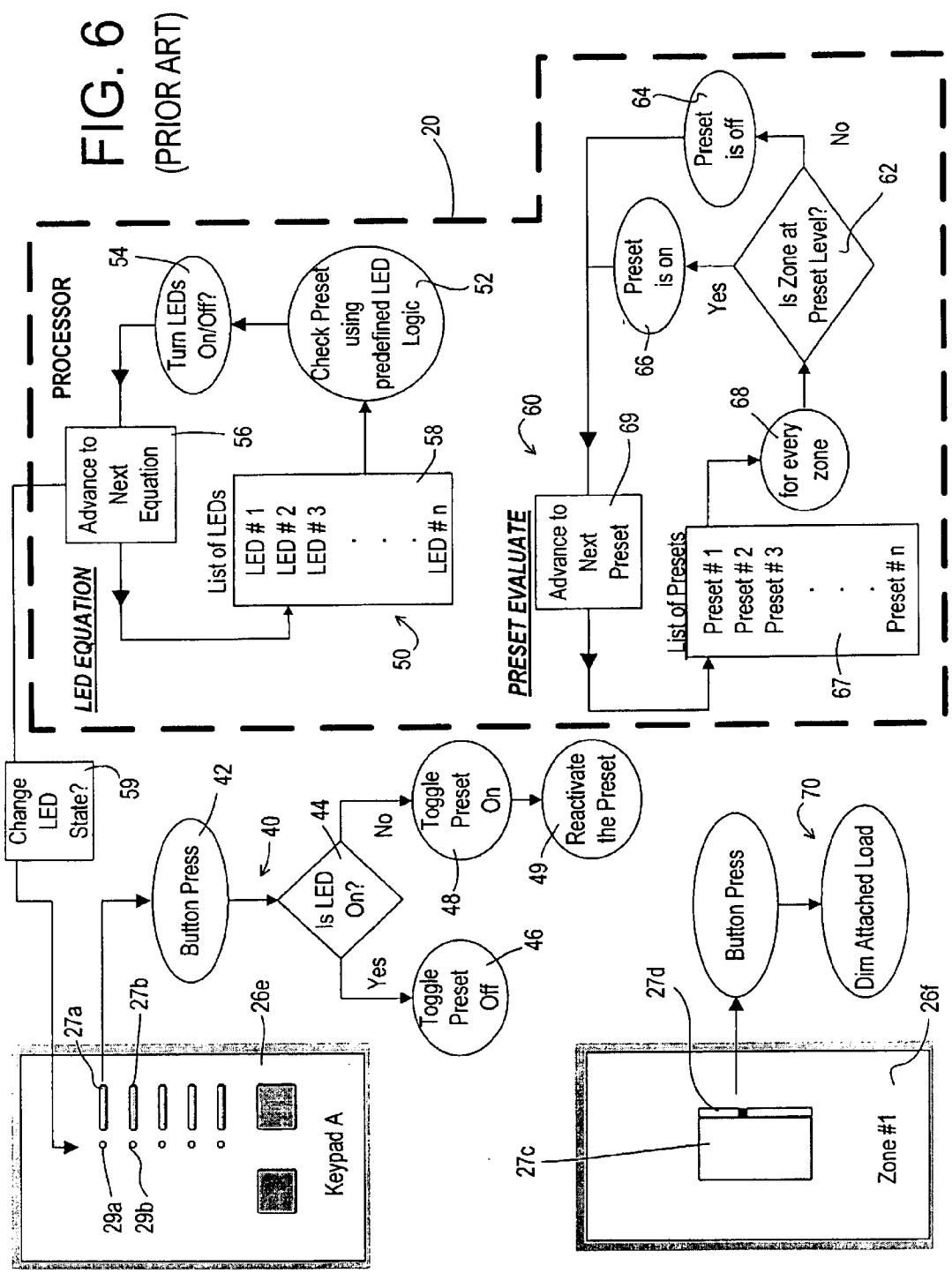
FIG. 6 shows the operation for toggle button processing according to the prior art.

Understanding of the toggle button processing and related activities that take place within the wired processor 20 (FIG. 4) can be facilitated by referring to FIG. 6. Thus, the toggle button 27a is associated with a process 40 that involves the steps of button pressing as indicated by step 42, causing the software to query whether the LED 29a is ON (step 44). If it is not, the process 40 proceeds to step 48 to toggle the preset on or activate the preset. In addition, the preset is preactivated to On at step 49 before being processed by a "Preset Evaluate" routine, to be described later. If the LED is on, the process proceeds to step 46 where the preset is turned off or deactivated.

An independent process 50 within the wind processor 20 checks the "preset" assigned to the toggle button 27a using predefined LED logic at step 52. The processor software has a table 58 containing a list of all LEDs in the system and their states. It thereafter turns the LEDs for the various keypads in the system ON and OFF at step 54, depending on the state of the preset. It then advances to the step 56 where it examines the table 58 for the next LED in the system which corresponds to another actuator device. This process continues repeatedly.

Thereby, the "preset" assigned to any given toggle button is constantly monitored to determine whether the state of the LED should change. The "preset" is checked using the LED logic predefined in that preset (i.e. room, scene, or pathway). If a change in the preset state occurs, the LED changes its state in response. The changing of the status of any given LED as indicated by step 59.

Accordingly, when the toggle button is actuated, the state of the preset assigned to the button changes—the preset is either activated or deactivated. The state of the preset is determined by the state of the LED, either on or off. Further, the preset assigned to the particular toggle button is constantly monitored to determine if the state of the LED should change. If the preset changes state, the LED may also change state in response.

A preset evaluate process 60 controls the state of the loads, for example, the light 22f. At step 62, the software queries whether a zone, i.e., the loads assigned to a zone, is at the preset level. If yes, the "preset" is ON as indicated at step 66; if no, the preset is OFF, as indicated at step 64. The process then proceeds to step 69 to advance to the next preset which is selected from the list of presets in table 67 and, in this manner, the step 68 causes the evaluation of all of the presets for all of the zones in the system. Thereby, every zone assigned to a preset is evaluated to determine if it is at the level specified in the preset. If every zone is at the appropriate level, the preset is on.

As further indicated in FIG. 6, if the dimmer control 26f has its button 27c activated to obtain the dimming position indicated by 27d, the process 70 causes the load attached to that switch to dim to the set level. This action affects the state of all presets that have that particular load assigned to the preset.

Note further relative to the toggle button 27a that, if LED 29a is not lit, the button press will turn on the preset. The preset will also be preactivated to On before being processed by the preset evaluate process 60.

Figure 7:
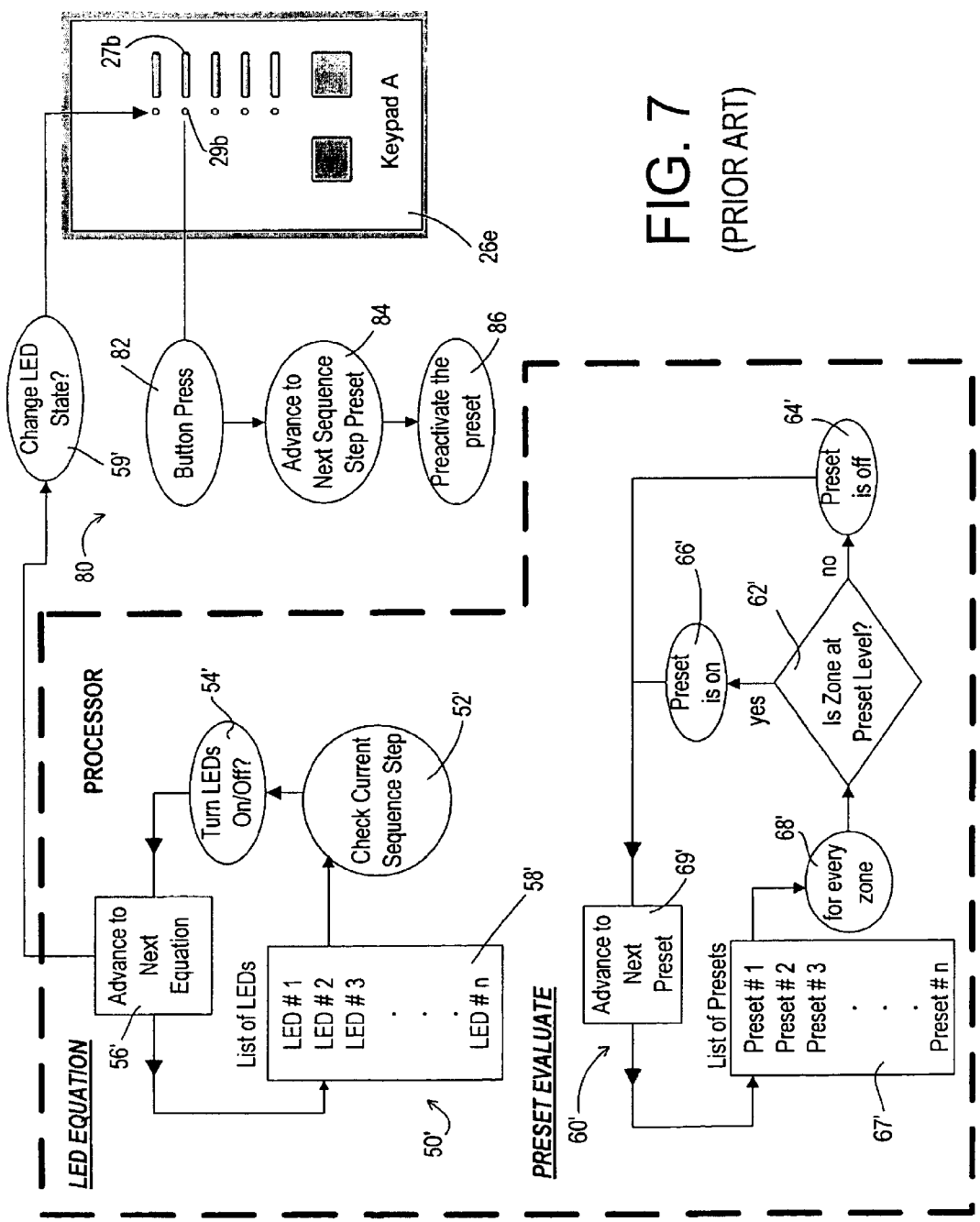
FIG. 7 shows how sequence button processing operates according to the prior art.

Prior art FIG. 7 diagrams the sequence button processing steps. The LED equation process 50' contains the step 52'; 54'; 56' and the table 58', which correspond in function and structure to the steps 52; 54; 56 and to the table 58 in the process 50 of FIG. 6. In this instance, however, the current step of a sequence is constantly monitored to determine the state of the LED. Only the sequence step may affect the state of the LED, and the preset levels have no impact on how the sequence button LED 29b will update. Similarly, the preset evaluate process 60' corresponds to the process 60 in FIG. 6.

Routine 80 shows how sequences are implemented. Step 82 shows the button 27b being pressed to advance to the next sequence step preset, as shown at 84. Thereafter, the process preactivates the "preset" as indicated at 86.

When pressed, the button 27b will activate the preset for the next step in the sequence. The preset will also be preactivated to "on" before processing in the preset evaluate process 60'. The LED state is determined by the current step of the sequence. In the illustrated example, the LED 29b goes through an "on" state, a "flash 1" state, a "flash 2" state and an "off" state corresponding to steps 1, 2, 3 and 4 and to presets 2, 3, 4 and 5.

Thus, the "sequence" processing and the "preset" processing operate independently of one another leading to the drawbacks of the prior art as noted. If a local dimmer such as dimmer 26f of FIG. 6 is activated to dim the load, and then assign a different preset to the connected load, there will be no effect on the sequence, that is the sequence will remain in the state (or step) in which it presently is. Accordingly, the local dimmer 26f may dim the load to 25% (corresponding to a different preset), but the sequence remains where it is, for example, at 100% level, even though the lamp is now at 25% (a different preset). When the sequence button is next activated, the lamp will go to the next state in the sequence (75%), instead of what the user expects (0% or off). Similar sequencing problems may result if a toggle button, such as button 27a, is activated.

Figure 8:
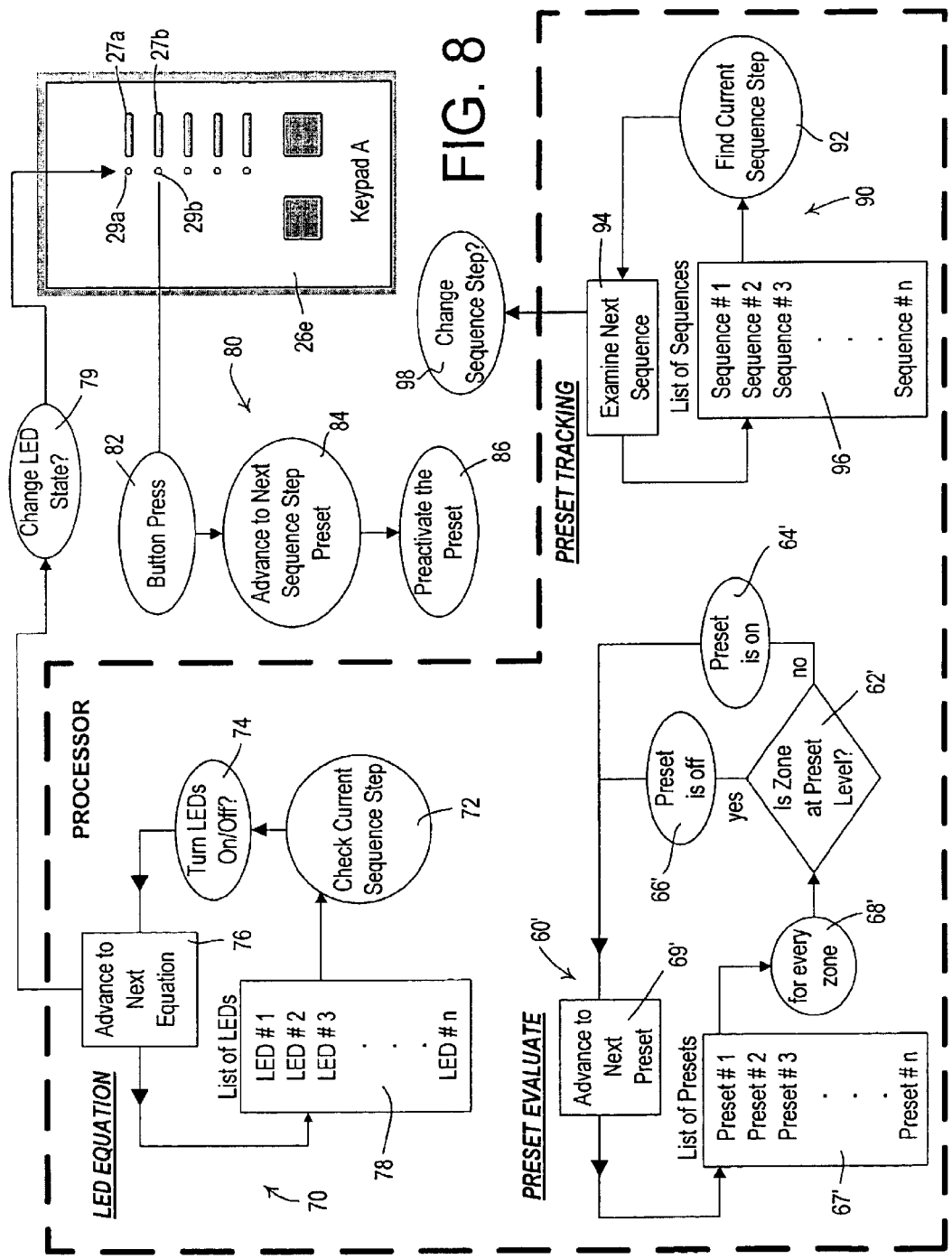
FIG. 8 shows a flow diagram illustrating how sequences of electrical device operation are tracked according to the present invention.

To avoid these drawback, FIG. 8 illustrate a solution that includes the prior art LED equation process comprising the process 70 and its sub-steps 72–79 as well as the preset evaluate process 60, 60' and their individual steps 62–69 and 62'–69'. In addition, the process and system of the present invention includes a further process 90 that comprises the step of finding the current sequence step (see process step 92) and thereafter examining the next sequence at step 94 to detect whether there has occurred any change in the presets assigned to the steps of each sequence. If a preset associated with a step has changed, the sequence step will be updated. This process proceeds through all of the sequences in the system as indicated in step 96. If a sequence is to be changed, it is updated as shown at step 98.

In this manner, and through the use of the preset tracking process 90, the sequences are constantly monitored to the deck that each sequence is in a valid step (preset is currently active). If the preset for a sequencing step is not active, the system determines that it should not be in that step. When it finds a preset that is active, this is the valid state and the sequence tracks or changes to that state. Thus, if the sequence is not in a valid step, it will "track" to a valid state where the preset is active and the sequence is kept updated at all times.

Figure 9:
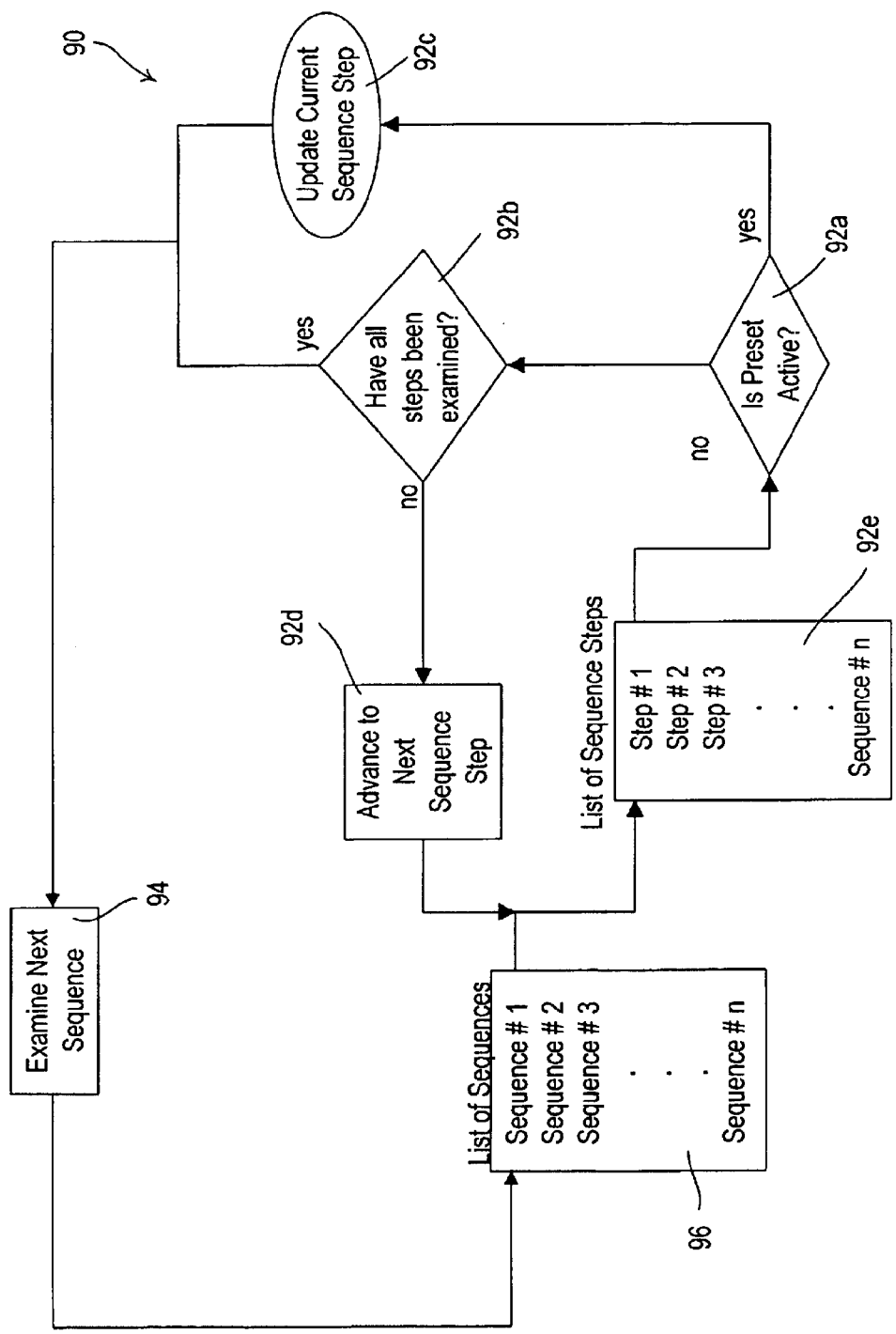
FIG. 9 shows the flow chart for the sequence tracking according to the present invention in greater detail.

The preset tracking process 90 is set forth with greater particularity in FIG. 9 which illustrates that the step 92 of FIG. 6 includes the sub-step 92a that tests whether the preset is active. If yes, the process proceeds to step 92c to update the current sequence step. (The sequence should be in that state). If no, the routine at step 92b queries whether all of the steps have been examined. If yes, the program proceeds to step 94 to examine the next sequence. Otherwise, the program advances to the next sequence step 92d to check the next step in the sequence in the list 92d to determine whether it is active. This process continues for all of the sequences in the table 96 repeatedly.

As described above, the sequence tracking process constantly updates each sequence to reflect the current state of the devices (lights, shades, fans, etc.) controlled by the sequence. Therefore, local button actuators that change a scene will be reflected in the sequence as it automatically "tracks" to the step where the current scene preset is active.

Advantages of the present invention include the sequence constantly updating itself in response to scene changes that occur in the system. The sequence will always reflect a scene that is true. Instead of operating independently, the sequences are seamlessly integrated into the system 10 such that they reflect any changes that are made by other controls. With the present invention, the user is presented with a more uniform system where the next press of the button produces an action that is expected and the corresponding LED indicates the current condition of the controlled load.

Figure 10:
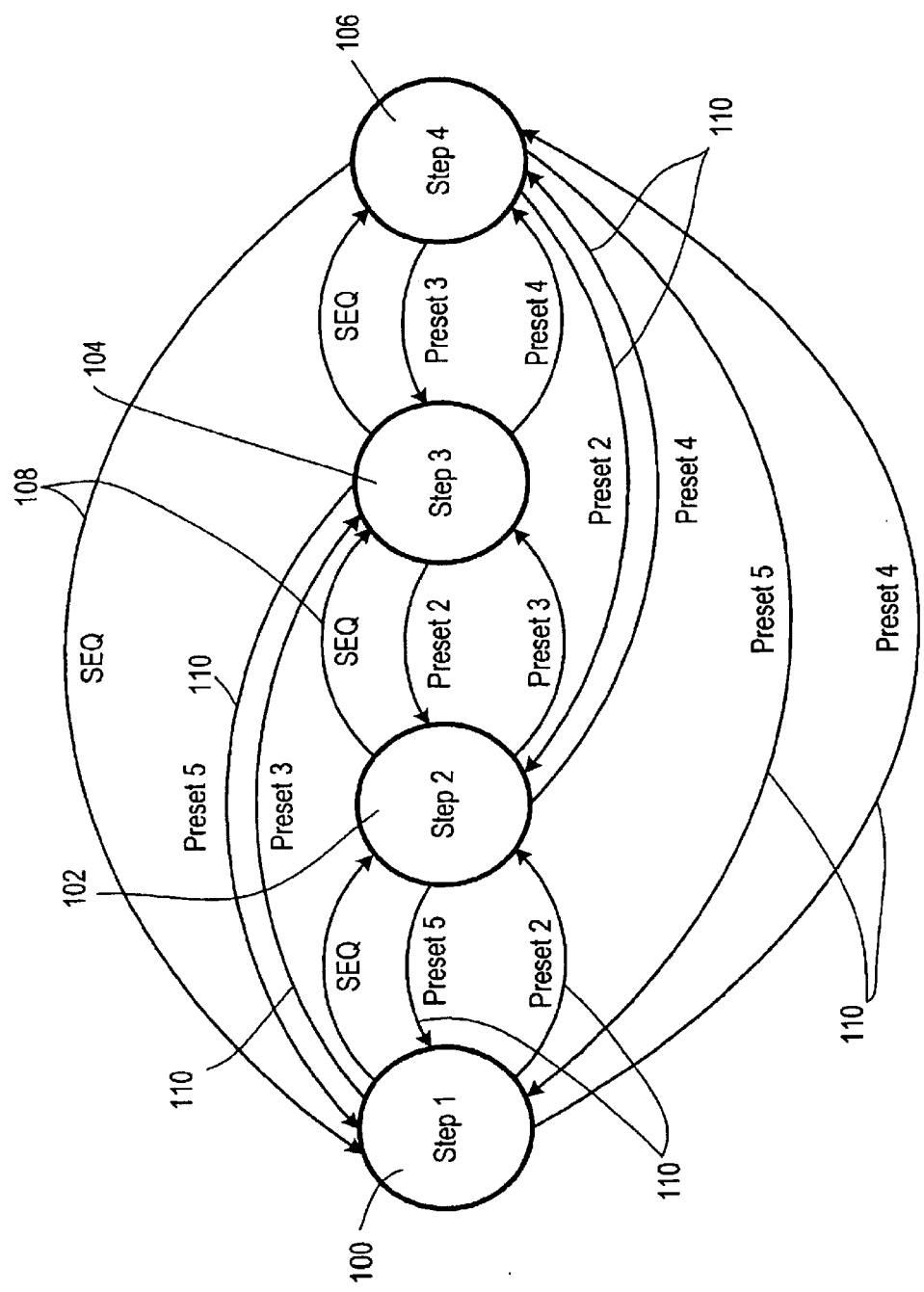
FIG. 10 shows a state diagram for a system according to the present invention tracking a four way step sequence.

FIG. 10 is a state diagram of the tracking sequences showing states 100, 102, 104 and 106 representing sequence steps, with arrow lines 108 that show that the traditional sequence can only proceed in the predetermined order through the states 100, 102, 104, 106 and back to 100. In accordance with the invention, when a preset changes, the system of the invention tracks the preset, so the system can move between any states, depending on how the presets change. This is illustrated by the lines 110 of FIG. 10. The present invention avoids the problem of the prior art by allowing the sequence processor to reflect the active preset.

Figure 11:
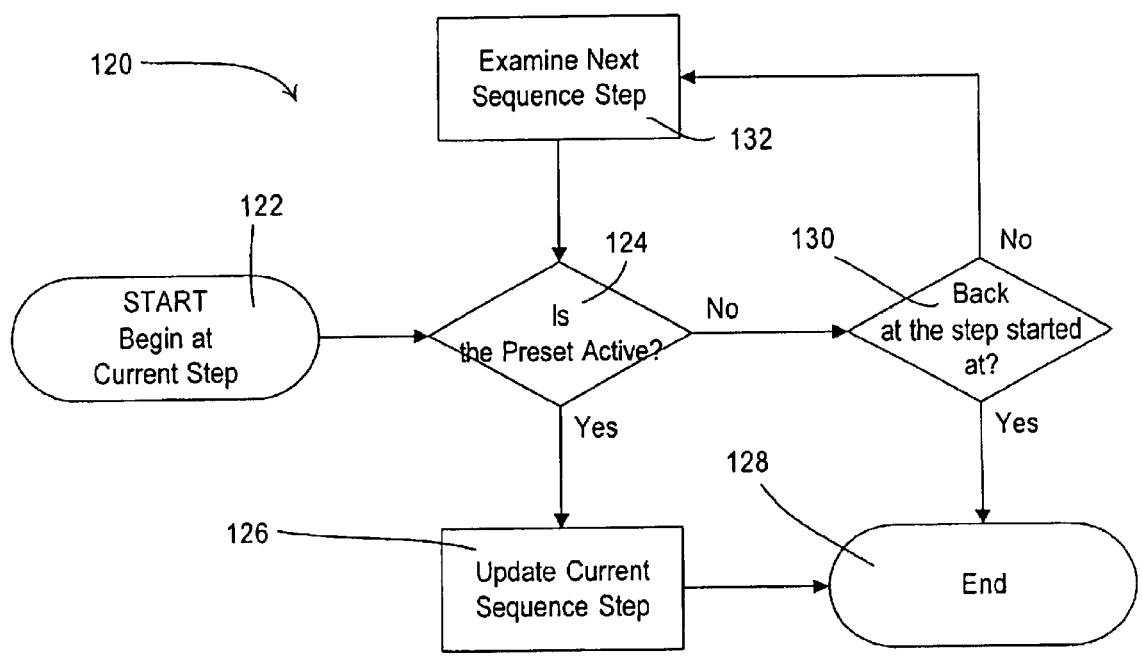
FIG. 11 shows an alternative embodiment of the flow chart of FIG. 9.

In the foregoing description, the preset tracking process runs as a constant process that constantly checks that the sequences are in valid steps. In FIG. 11, in response to a specific operation of any of the buttons on the device controllers, the tracking sequence enters the start/initiation of the process at 122 and thereafter determines in each given state of the sequence that the preset is active as noted at step 124. If it is, the program proceeds to step 126 where the current sequence step is updated and the process ends at step 128. If no, the program proceeds to the decision box 130 to determine whether the process has found the preset currently active. If yes, the process ends at step 128. If no, it proceeds to examine the next sequence step until all of the sequences are updated and the process ends. The process of FIG. 10 is therefore event driven, i.e., it begins when a button is actuated.

Figures 1, 2, 12:
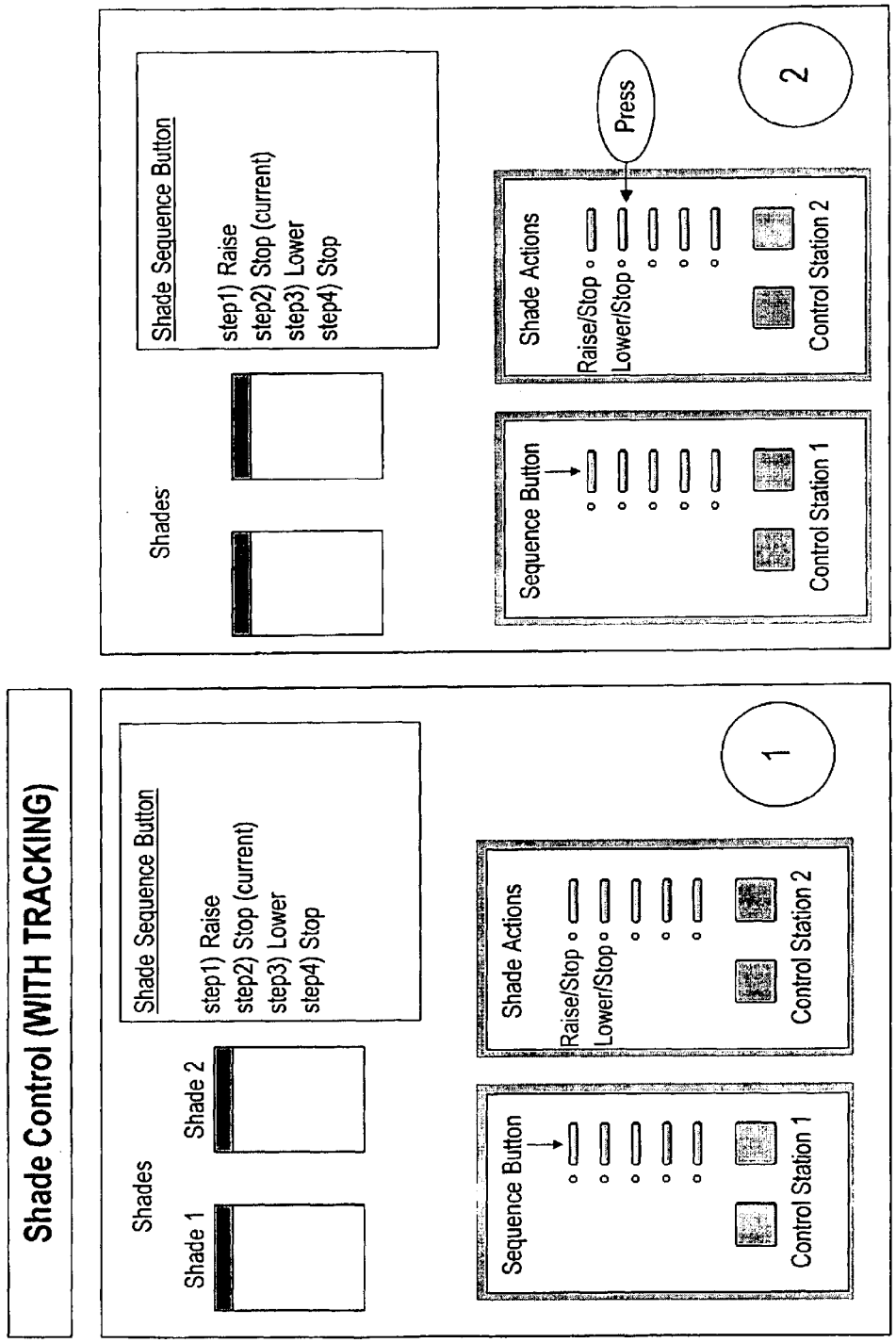
FIGS. 12–14, each comprising five panels, show how the system of the present invention would operate to properly track the sequences illustrated in FIGS. 1, 2 and 3.
Figures 4, 12:
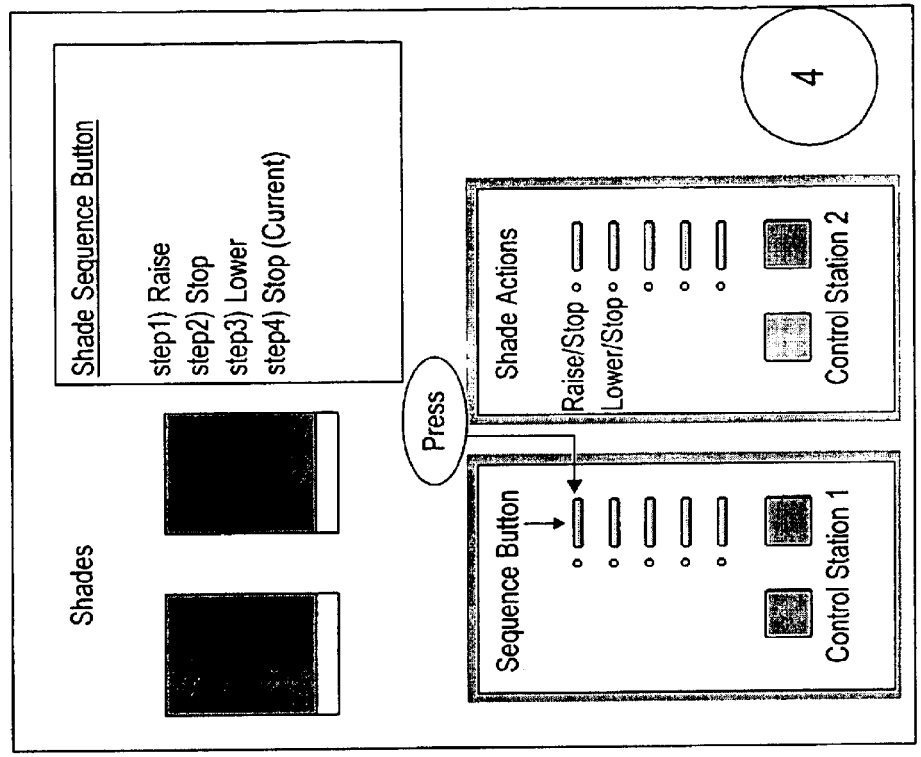
Figures 3, 12:
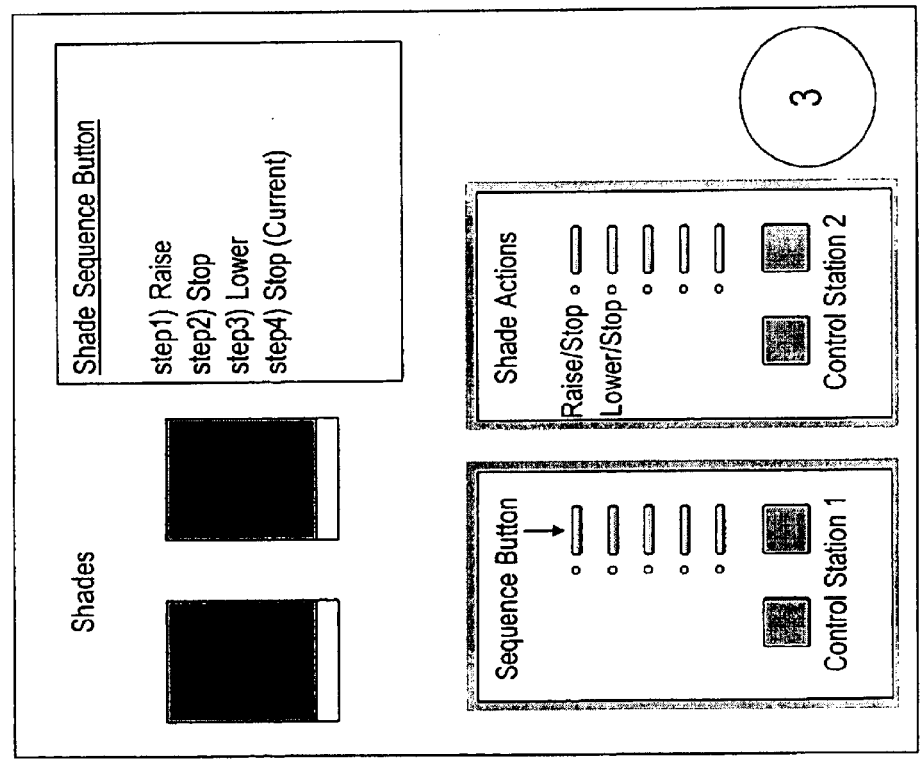
Figures 5, 12:
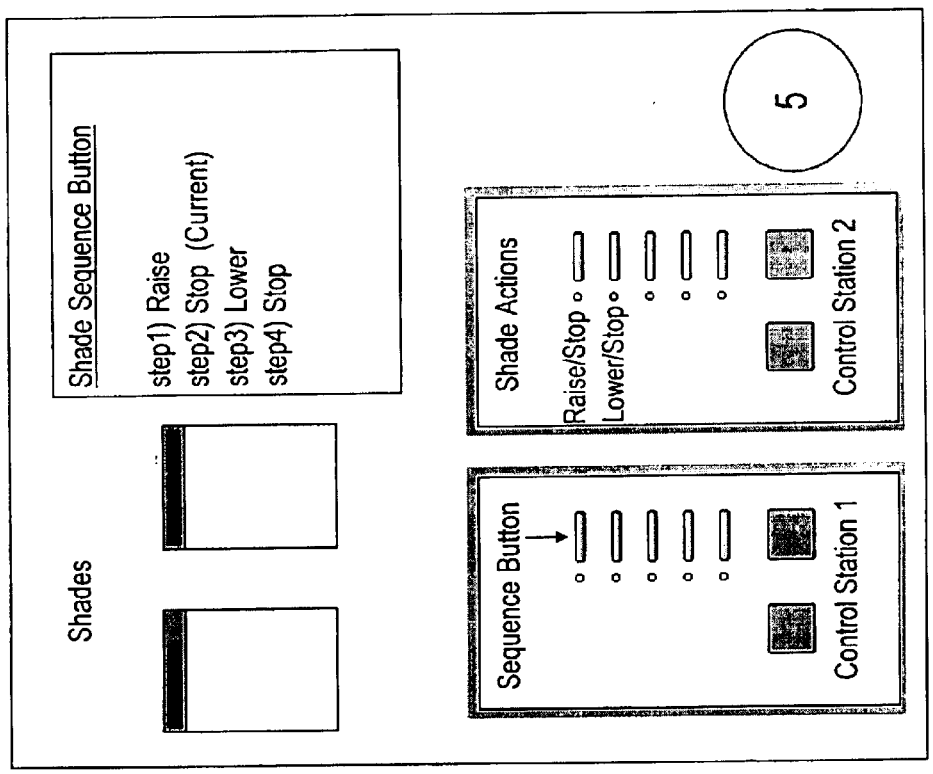
Figures 2, 13:
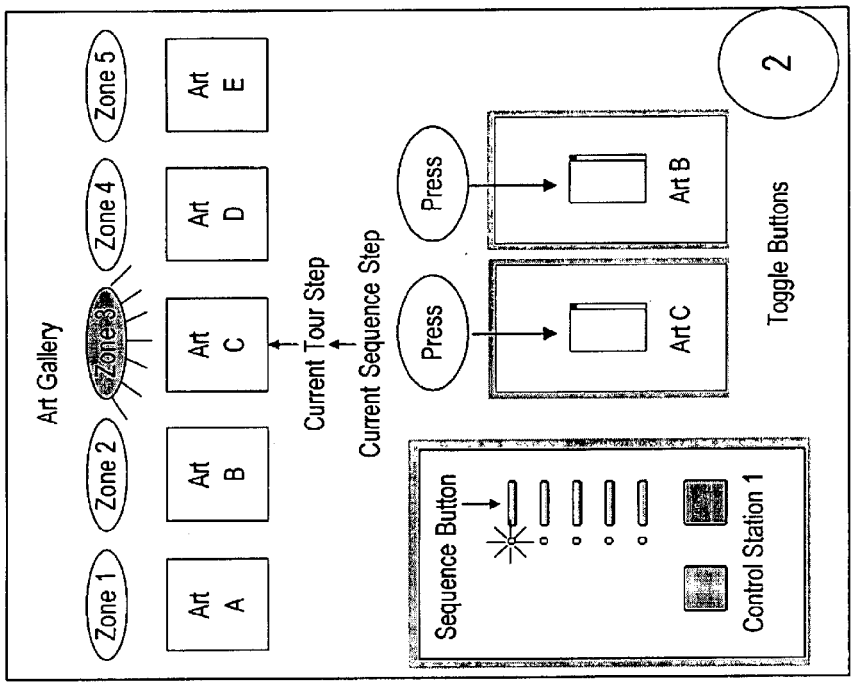
Figures 1, 13:
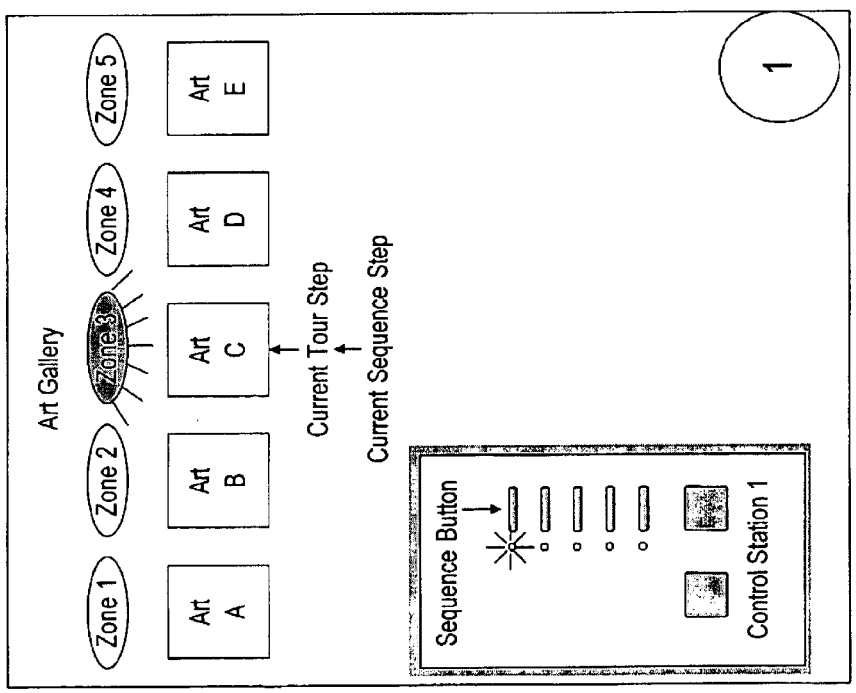
Figures 3, 4, 13:
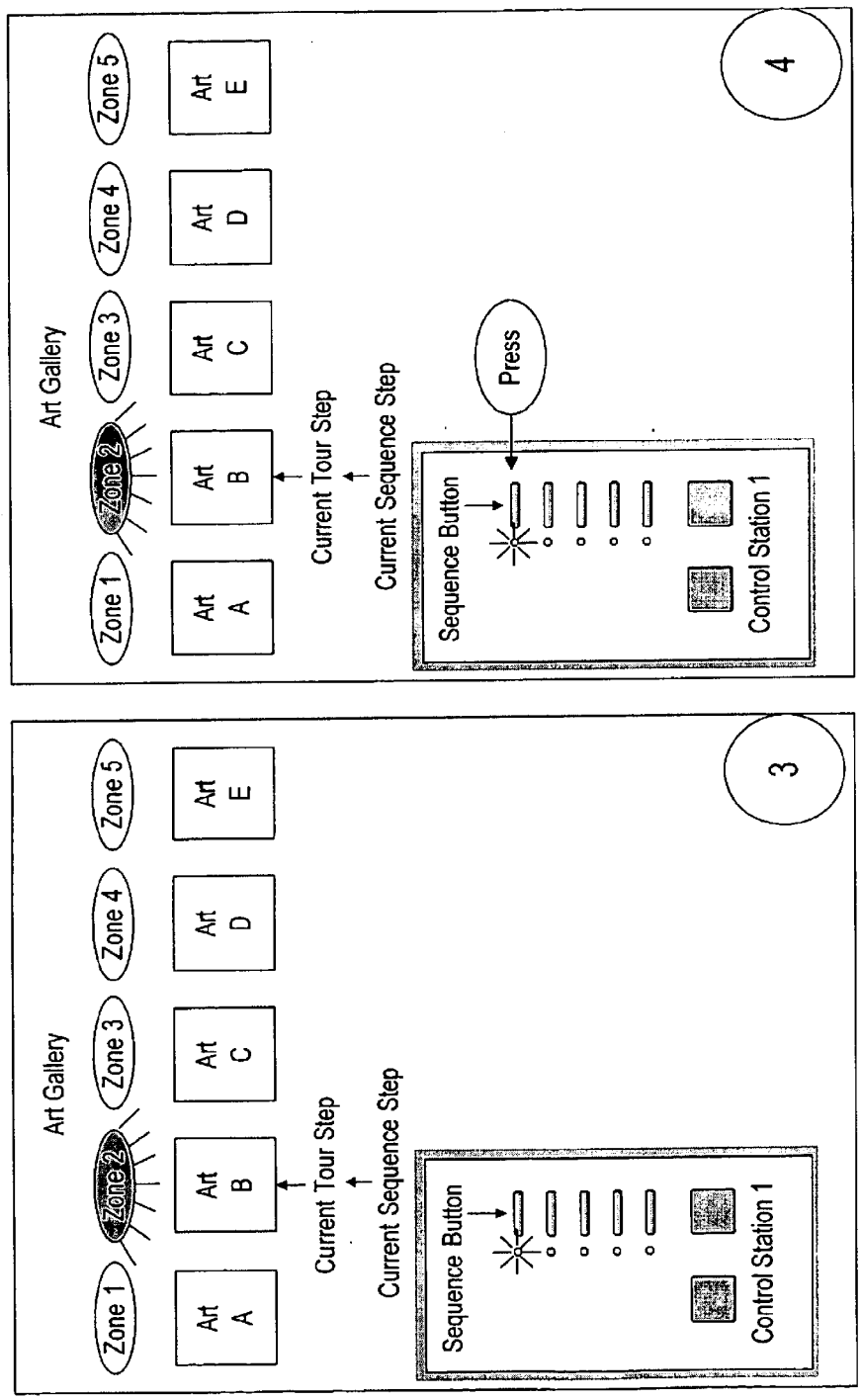
Figures 5, 13:
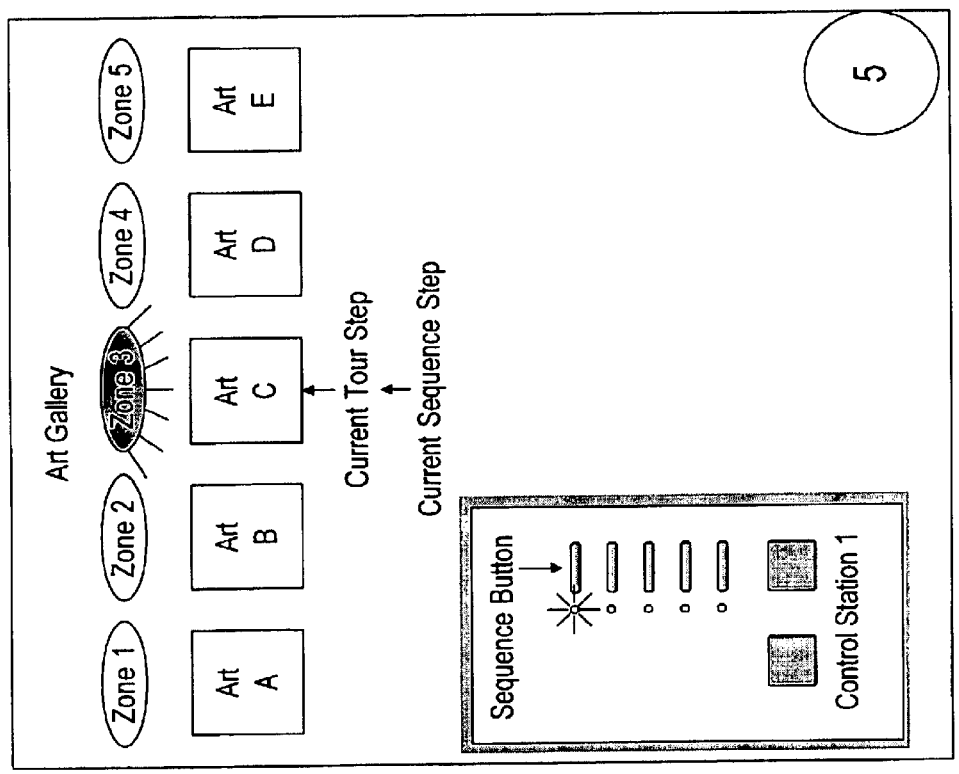
Figures 1, 2, 14:
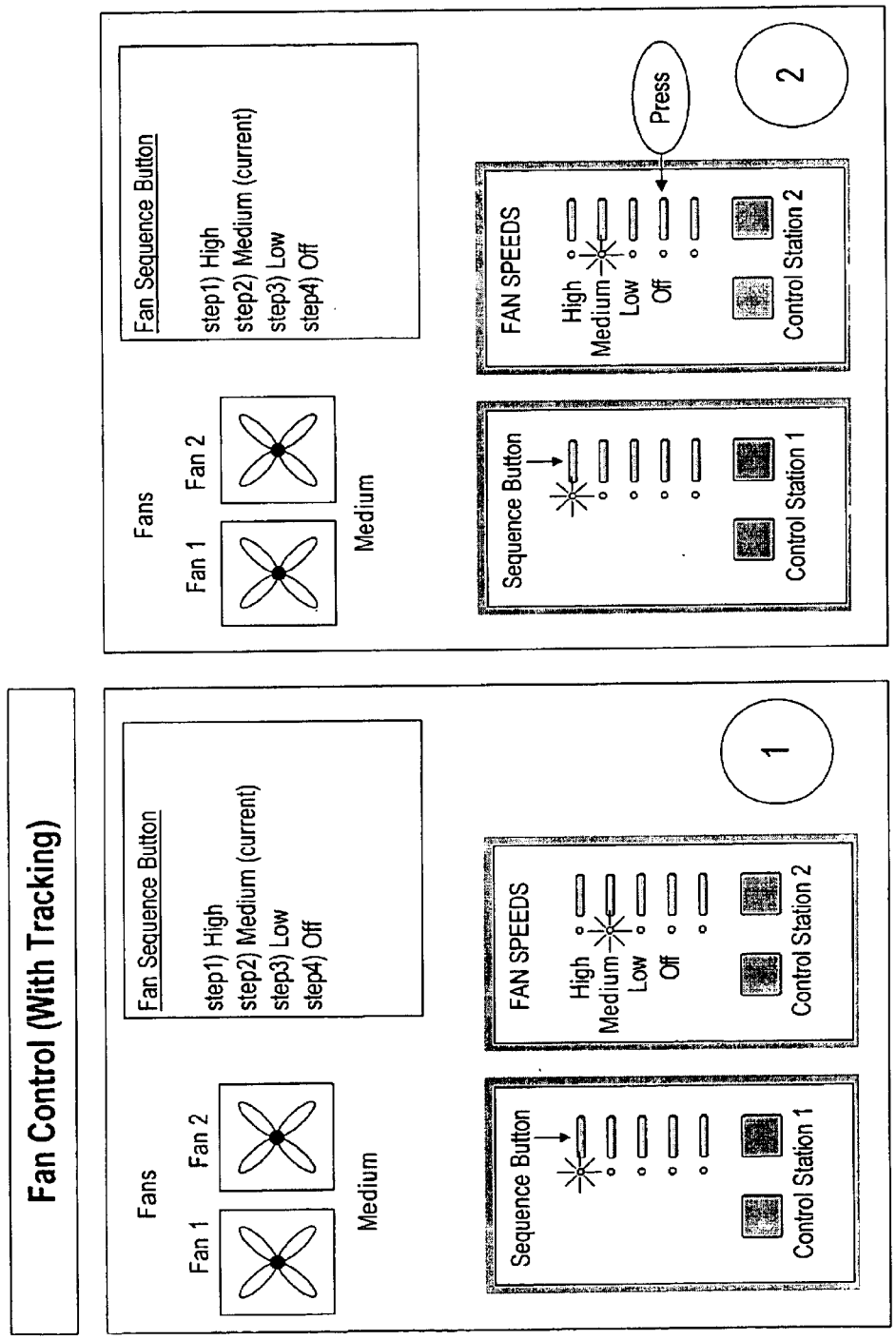
Figures 3, 4, 14:
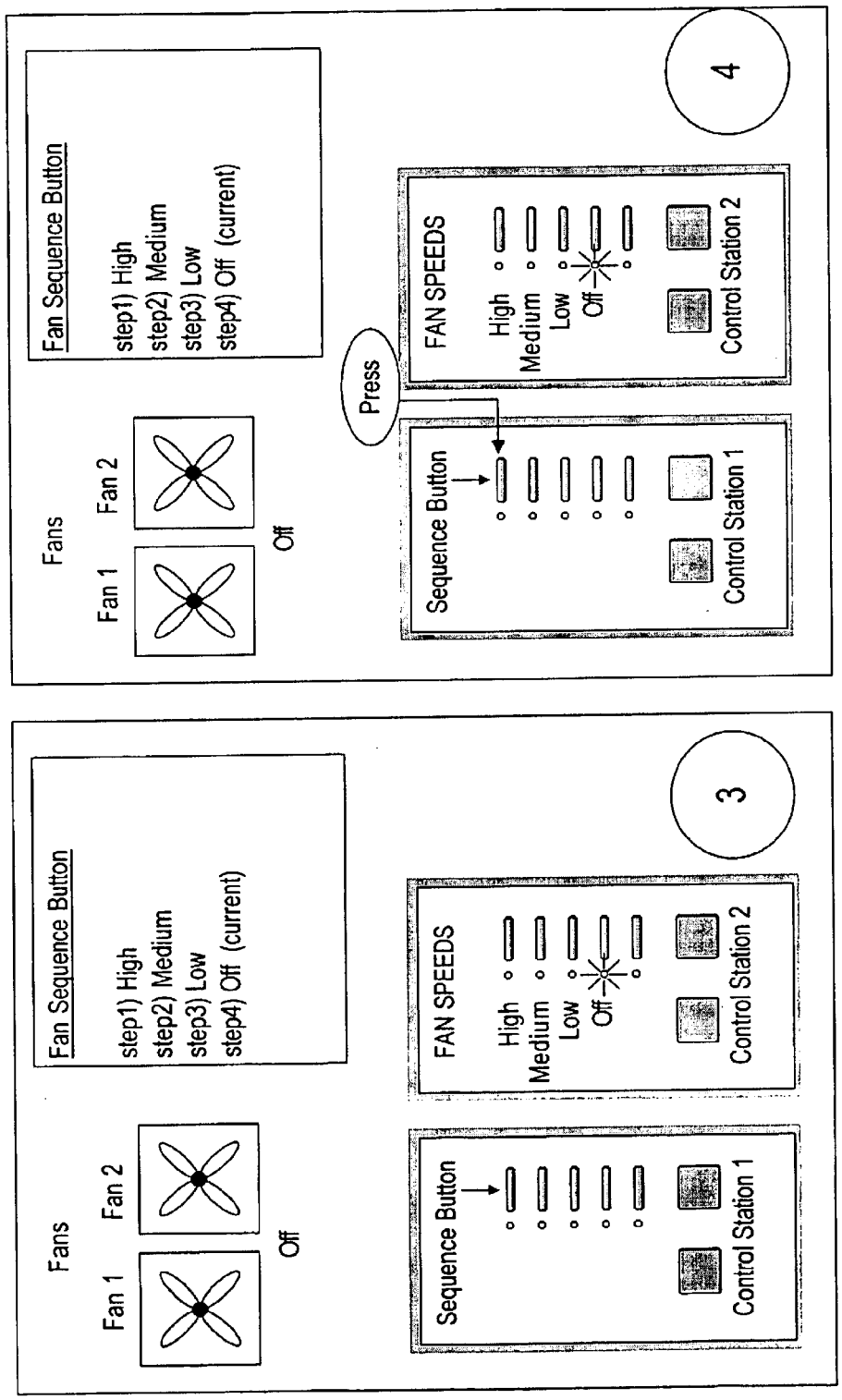
Figures 5, 14:
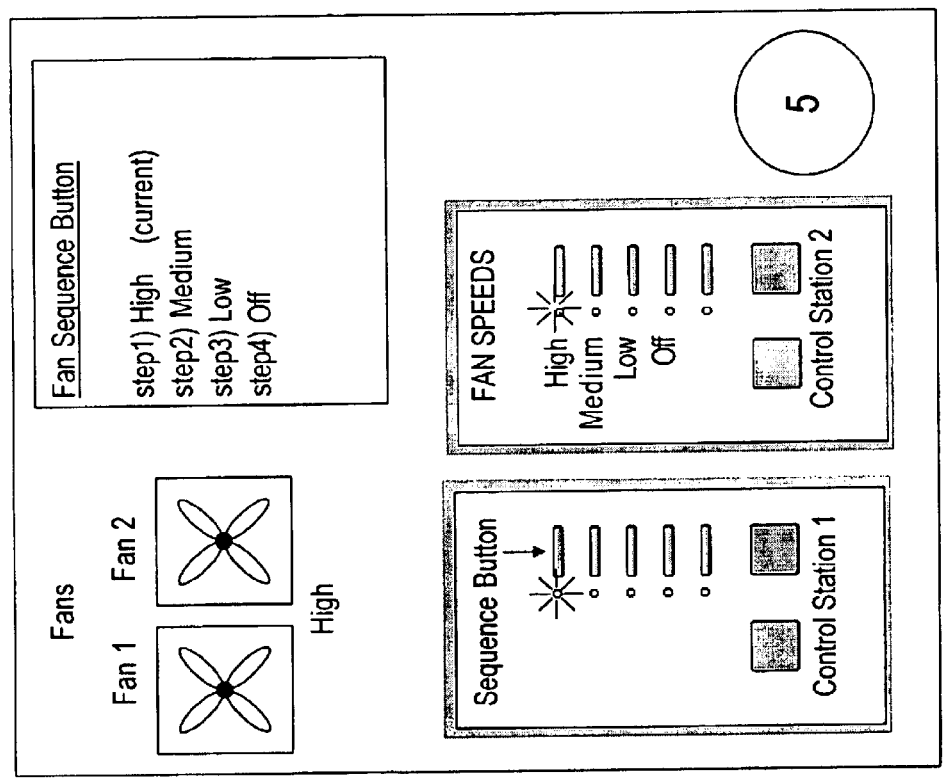

The problems of the prior art, as described in FIGS. 1–3, are accordingly, solved with the system and process of the present invention, as illustrated in FIGS. 12–14. Turning to FIG. 12, the panel 12-1 illustrates the condition when the sequence button at control station 1 had been pressed twice to raise and stop the shades. Thus, the sequence is in step 2. At control station 2, the Lower/Step button lowers the shades until they stop. (See panel 12-2.) As seen at panel 12-3, the shades lower and stop once they are fully "closed". The sequence recognizes the shades are lowered and now stopped, and "tracks" to step 4. Later that day (as seen in panel 12-4), the sequence button is pressed again. Because the shades are already "closed", the button press will raise the shades. Indeed, as illustrated at panel 12-5, the shades rise and then stop after opening completely. The sequence updates itself to step 2 (stopped after a raise) because of sequence tracking.

This tracking feature is also illustrated in FIG. 13, utilizing its panel 13-1, 13-2, 13-3, 13-4 and 13-5. Thus, the tour guide has been given the tour using the sequence button. The tour is at Art C (step 3) and the zone 3 light is ON. The guide wishes to go back to Art B and therefore, presses the toggle button at Art C to turn OFF the zone 3 light. Then the toggle button at Art B is pressed to turn on the zone 2 light. As shown at panel 13-3, now the guide is presenting Art B again, and the zone 2 light is ON. The sequence button recognizes that only zone 2 is ON and therefore "tracks" to step 2. In the next panel, the guide wishes to resume the tour and presses the sequence button to go to the next step. Because the tour is at Art B, the guide expects the light at Art C to turn ON. The lighting advances to Art C and the zone 3 light turns ON as expected, due to the utilization of the tracking feature.

The functionality of the invention is also illustrated in FIG. 14, relative to a fan control with tracking. The sequence button at control station 1, having been pressed twice, sets the fans at medium speed. Thus, the sequence is in step 2 (panel 14-1). At control station 2, a button is pressed to turn the fans OFF (panel 14-2). The fans turn OFF and stops rotating. The sequence "tracks" to step 4 and the LED turns OFF, because the fans are Off. As shown at panel 14-4, the next day, the sequence button at control station 1 is pressed. Because the fans are OFF, the fans will turn on to High (the first step in the sequence). As expected, due to tracking (see panel 14-5), the fans turn ON to High, as expected, because of sequence tracking.

Although the present invention has been described in relation to particular embodiments thereof, many other variations and modification and other uses will become apparent to those skilled in the art. Therefore, the present invention should be limited not by the specific disclosure herein, but only by the appended claims.

What is claimed is:

1. A tracking system for an arrangement comprising controlled devices that can have more than one state and device operators therefor, the system comprising:

at least one device operator of a first type that is capable of setting a plurality of sequence steps for a corresponding controlled device, in which each step represents a given state of the controlled device and in which the sequence steps normally follow one another in a prescribed order;

a sequencer associated with the at least one device operator of the first type that operates to normally cause the steps to follow one another through the sequence steps;

at least one other device operator operable to cause the corresponding controlled device to assume a preset state different than that previously set by the device operator of the first type; and a tracking sensor that senses changes in the state of the controlled device due to activation of the other device operator and which conforms the state of the sequencer to track the current state of the controlled device, so that a subsequent actuation of the device operator of the first type will cause the controlled device to assume the next state in the prescribed order.

2. The system of claim 1, in which the controlled device is a light.

3. The system of claim 1, in which the controlled device is a relay.

4. The system of claim 1, in which the controlled device is a programmable item having a state variable.

5. The system of claim 1, in which the controlled device is a fan.

6. The system of claim 1, in which the controlled device is a shade.

7. The system of claim 1, further including a plurality of device operators of the first type, a plurality of the other device operators and a plurality of controlled devices to be controlled by respective ones of said device operators.

8. The system of claim 7, in which the other device operators are of a second type different than the first type.

9. The system of claim 1, in which the device operator of the first type comprises a corresponding visual indicator that indicates the current step of the sequence.

10. The system of claim 9, in which the visual device is an LED.

11. The system of claim 1, in which the other device operator is a dimmer switch that serves to control its corresponding electrical device for ON and OFF operation.

12. The system of claim 11, further including a visual indicating device that reflects the state of the dimmer switch.

13. The system of claim 12, further including a process that monitors the state of the dimmer switch and conforms the visual device to a current state.

14. The system of claim 1, including a process that checks that the sequence steps are in conformance with current states of associated controlled devices.

15. The system of claim 1, including a control processor for processing inputs from the at least one device operator of the first type and from the at least one other device operator.

16. The system of claim 15, in which the at least one device operator of the first type communicates with the control processor wirelessly.

17. The system of claim 15, in which the at least one other device operator communicates with the control processor wirelessly.

18. The system of claim 15, further including wireless device operators and an RF controller for coupling signals from the wireless device operators to the control processor.

19. The system of claim 1, including a plurality of the controlled devices, a plurality of device operators for the plurality of controlled devices and the plurality of device operators comprising devices that operate through hardware connections and/or devices that operate wirelessly.

20. The system of claim 1, in which the tracking sensor becomes activated by activation of any of the device operators.

21. The system of claim 1, in which the sequence steps include the steps of controlling a light for at least ON, OFF and two intermediate light levels.

22. The system of claim 21, including a visual indicator for the sequence steps that includes the visual indications: ON, FLASH 1, FLASH 2 and OFF corresponding to the light levels.

23. The system of claim 7, in which at least one of the device operators is a dimmer switch.

24. The system of claim 14, in which the process includes a system tracking process.

25. The system of claim 24, in which the process includes a LED evaluation process and a preset evaluate process.

26. The system of claim 14, in which the process is a scheduled activity.

27. The system of claim 14, in which the process is a constantly running process.

28. The system of claim 14, in which the process in an event-driven process that runs in response to actuation of one or more of the device operators.

29. A method of tracking and maintaining device states in a system arrangement comprising controlled devices and device operators therefor, the method comprising the steps of:

providing a system arrangement which includes a plurality of controlled devices that require to be controlled, a plurality of device operators for the plurality of controlled devices and a controller for receiving inputs from the device operators for controlling respective ones of the controlled devices, wherein at least one of the controlled devices is operable by inputs received from more than one of the device operators;

operating at least one of the device operators to normally follow a prescribed sequence of steps for its associated electrical device, in which each step represents a given state of the controlled device and in which the sequence steps normally follow one another in a prescribed order; and adjusting a current sequence step of the device operator whenever the state of the controlled device thereof has been changed in response to a signal received from another device operator.

30. The system of claim 29, including operating the adjusting step in a scheduled manner.

31. The method of claim 29, including providing a visual indicator on the device operator that indicates a current state of the device operator.

32. The method of claim 29, including operating a process that checks that the sequence steps are in conformance with current states of associated electrical devices.

33. The method of claim 29, including operating the adjusting step constantly.

34. The method of claim 29, including operating the adjusting step in a manner which is event-driven.

* * * * *